United States Patent
Jovicic et al.

(10) Patent No.: US 9,482,734 B2
(45) Date of Patent: Nov. 1, 2016

(54) METHODS AND APPARATUS FOR TRIGGERING COOPERATIVE POSITIONING OR LEARNING IN A WIRELESS NETWORK

(75) Inventors: Aleksandar Jovicic, Jersey City, NJ (US); Junyi Li, Chester, NJ (US); Cyril Measson, Somerville, NJ (US); Thomas Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 770 days.

(21) Appl. No.: 13/073,840

(22) Filed: Mar. 28, 2011

(65) Prior Publication Data

US 2012/0249372 A1 Oct. 4, 2012

(51) Int. Cl.
*G01S 3/02* (2006.01)
*G01S 1/04* (2006.01)
(Continued)

(52) U.S. Cl.
CPC .............. *G01S 1/042* (2013.01); *G01S 5/0072* (2013.01); *H04W 4/02* (2013.01); *G01S 5/0221* (2013.01); *G01S 5/0226* (2013.01); *G01S 5/0242* (2013.01); *G01S 5/0289* (2013.01)

(58) Field of Classification Search
CPC ........ G01S 5/02; G01S 5/021; G01S 5/0221; G01S 5/0226; G01S 5/0236; G01S 5/242; G01S 5/0252; G01S 5/0242; H04W 4/02; H04W 4/023; H04W 4/025; H04W 64/00; H04L 29/08657
USPC .................. 342/451, 387, 463–465, 450; 455/456.1–457
See application file for complete search history.

(56) References Cited

U.S. PATENT DOCUMENTS 6,839,560 B1 * 1/2005 Bahl et al. ................. 455/456.1
7,353,034 B2 * 4/2008 Haney .................. H04W 12/08
455/411

(Continued)

FOREIGN PATENT DOCUMENTS

CN 103339522 A 10/2013
JP 2006527542 A 11/2006
(Continued)

OTHER PUBLICATIONS

International Search Report and Written Opinion—PCT/US2012/031024—ISA/EPO—Dec. 7, 2012.
(Continued)

*Primary Examiner* — Jack W Keith
*Assistant Examiner* — Chuong P Nguyen
(74) *Attorney, Agent, or Firm* — Bala Ramasamy

(57) ABSTRACT

One or more bits are used in peer discovery signals to signal a device's ability and/or willingness to participate in a cooperative manner with regard to one or more mobile device location determination related operations. In some embodiments, the one or more bits are located at predetermined locations within a header portion of a peer discovery signal. Different bits, in some embodiments, are associated with different specific cooperative location determination related operations. The peer discovery signal is transmitted, e.g., broadcast, periodically or on some predetermined basis by a mobile wireless communications device. In this manner, a device listening to the peer discovery signals can determine other devices' willingness to perform particular location discovery related operations with very little signaling overhead.

25 Claims, 14 Drawing Sheets

(51) Int. Cl.
*H04W 4/02* (2009.01)
*G01S 5/00* (2006.01)
*G01S 5/02* (2010.01)

(56) References Cited

U.S. PATENT DOCUMENTS

| | | | |
|---|---|---|---|
| 7,403,784 B2* | 7/2008 | Ju et al. | 455/456.2 |
| 7,446,662 B1* | 11/2008 | Somogyi et al. | 340/572.4 |
| 7,734,298 B2* | 6/2010 | Bhattacharya et al. | 455/456.1 |
| 8,364,172 B2* | 1/2013 | Guanfeng et al. | 455/456.2 |
| 8,634,796 B2* | 1/2014 | Johnson | H04W 4/02 455/404.1 |
| 2004/0185839 A1* | 9/2004 | Seligmann et al. | 455/417 |
| 2006/0075131 A1 | 4/2006 | Douglas et al. | |
| 2008/0248813 A1 | 10/2008 | Chatterjee | |
| 2008/0268873 A1 | 10/2008 | Wymeersch et al. | |
| 2009/0013081 A1 | 1/2009 | Laroia et al. | |
| 2009/0016225 A1* | 1/2009 | Laroia et al. | 370/241 |
| 2009/0016255 A1* | 1/2009 | Park | 370/312 |
| 2009/0323648 A1* | 12/2009 | Park et al. | 370/338 |
| 2010/0083354 A1 | 4/2010 | Tsirtsis | |
| 2010/0250673 A1 | 9/2010 | Laroia et al. | |
| 2010/0260150 A1 | 10/2010 | Aryan et al. | |
| 2011/0082939 A1* | 4/2011 | Montemurro et al. | 709/227 |
| 2011/0274094 A1* | 11/2011 | Jovicic et al. | 370/338 |
| 2012/0116677 A1* | 5/2012 | Higgison et al. | 701/518 |
| 2012/0182144 A1* | 7/2012 | Richardson et al. | 340/539.13 |
| 2012/0184219 A1* | 7/2012 | Richardson et al. | 455/67.11 |

FOREIGN PATENT DOCUMENTS

| | | |
|---|---|---|
| JP | 2008022180 A | 1/2008 |
| KR | 20100053693 A | 5/2010 |
| WO | WO-2005001619 A2 | 1/2005 |
| WO | WO-2010052496 A1 | 5/2010 |
| WO | WO-2010099226 | 9/2010 |
| WO | WO-2010114931 A2 | 10/2010 |

OTHER PUBLICATIONS

Jiau H.C., et al.,"Localization With Mobile Anchor Points in Wireless Sensor Networks", IEEE Transactions on Vehicular Technology, IEEE Service Center, Piscataway, NJ, US, vol. 54, No. 3, May 1, 2005, pp. 1187-1197, XP011132669, ISSN: 0018-9545, DOI: 10.1109/TVT.2005.844642.

Kortuem G., et al., "When Peer-to-Peer comes Face-to-Face: Collaborative Peer-to-Peer Computing in Mobile Ad hoc Networks," Proceedings First International Conference on Peer-to-Peer Computing, 2001, pp. 75-91.

Wymeersch H., et al., "Cooperative Localization in Wireless Networks," Proceedings of the IEEE, Feb. 2009, vol. 97 (2), pp. 427-450.

Zhang P., et al., "Locale: Collaborative Localization Estimation for Sparse Mobile Sensor Networks", Information Processing in Sensor Networks, 2008. IPSN '08. International Conference on, IEEE, Piscataway, NJ, USA, Apr. 22, 2008, pp. 195-206, XP031246711, ISBN: 978-0-7695-3157-1.

European Search Report—EP14168260—Search Authority—Munich—Jul. 14, 2014.

* cited by examiner

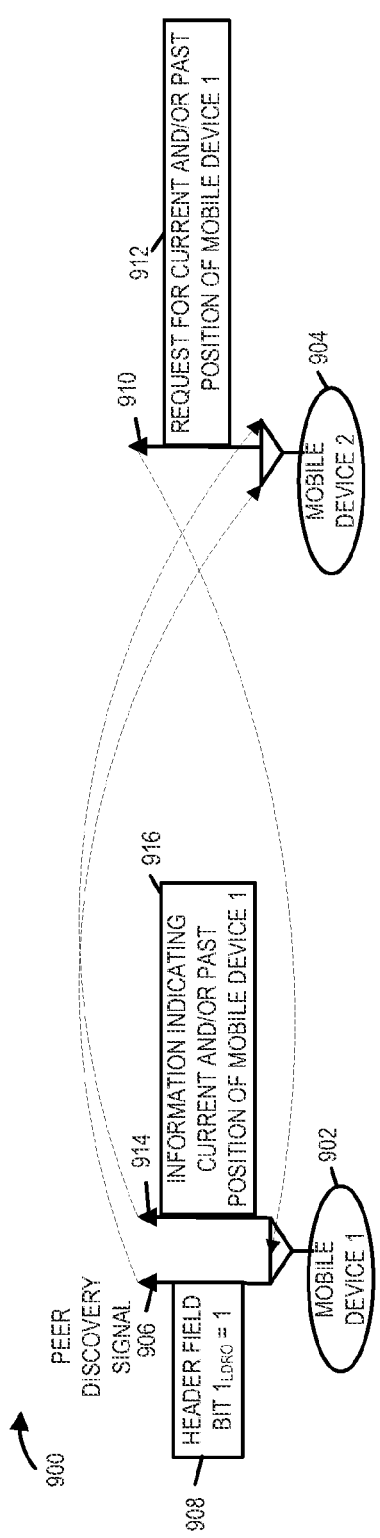
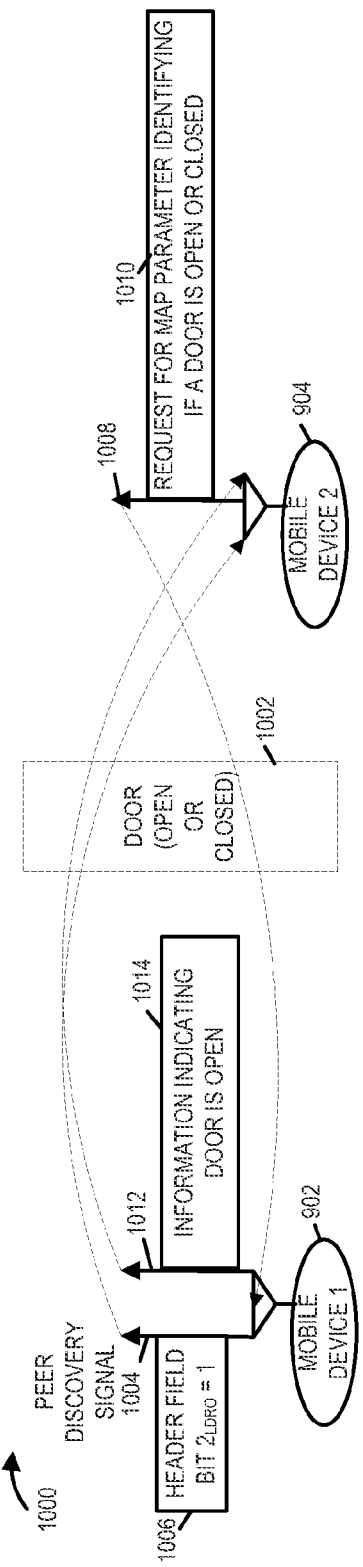

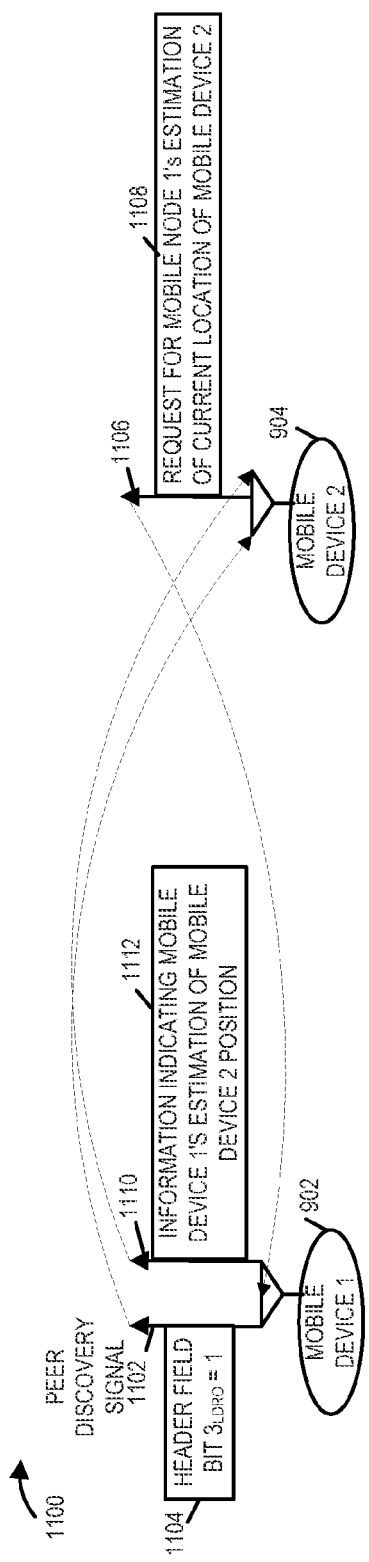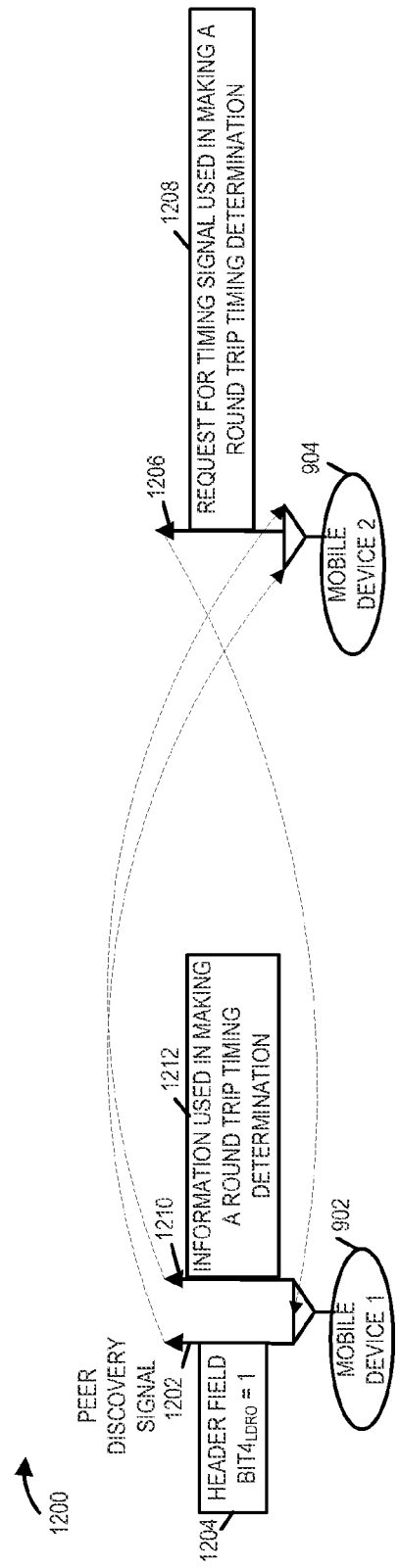

METHODS AND APPARATUS FOR TRIGGERING COOPERATIVE POSITIONING OR LEARNING IN A WIRELESS NETWORK

FIELD

Various embodiments relate to mobile device location determination related operations, and more particularly, to location determination related methods and apparatus involving mobile device cooperation.

BACKGROUND

It can be useful and desirable to perform mobile wireless device position determination in a wireless communications system. Accurate mobile wireless device position determination can be a difficult task particularly in an indoor environment. There may be an insufficient number of permanent fixed location anchor points from which to transmit reference signals or measured detected signals. It may be inconvenient or impractical, e.g., from a physical construction viewpoint or financial cost benefit analysis viewpoint, to install and operate a complete set of permanent fixed location anchor points in the building to provide full coverage. Some mobile device location determination approaches are based on the use a signal reference map with measured signals being matched to expected values. However, the initial signal reference map may have been based on a limited or incomplete survey and/or estimation. The survey which generated the map may have used a very limited number of actual measurements and relied on a large amount of estimation and/or interpolation. As another example, accurate signal loss parameters associated with different wall construction materials and/or different wall thicknesses used throughout a building may not be known. In addition environmental conditions may change over time, e.g., a door may be opened or closed at different times of a day, partitions may be added in an office due to remodeling, furniture may be added, removed or rearranged, different electrical equipment may be installed in the building over time, different electrical equipment may be operating at different times of the day, etc.

Based on the above discussion it should be appreciated that there is a need for improved methods and apparatus related to mobile device position determination to provide move complete and/or accurate location determination of mobile devices. At times one mobile device may be in a situation where it could provide assistance in determining the location of other mobile devices. Cooperation is particularly challenging in wireless networks where many physical resources such as power or network capacity are limited. In a cooperative positioning framework, it is beneficial if distributive approaches used for different types of joint position estimation and/or joint environment estimation are resource efficient, e.g., in terms of air link resource utilization.

In view of the above discussion, it should be appreciated that there is a need for methods and apparatus for facilitating cooperation with regard to position determination operations. It would be beneficial if such methods and/or apparatus allowed cooperation when needed without excessive overhead and/or unnecessary signaling.

SUMMARY

Various embodiments relate to cooperative methods for environment learning and/or position determining in a wireless communications system, e.g., in a peer-to-peer network. In accordance with various embodiments one or more bits are used, e.g., in a predetermined dedicated manner, in peer discovery signals to signal a devices ability and/or willingness to participate in a cooperative manner with regard to one or more location determination related operations. The bit or bits conveying cooperative location determination operation capabilities, in some embodiments, are located in a predetermined location within a header portion of a peer discovery signal. The peer discovery signal, in some embodiments, is transmitted, e.g., broadcast, periodically or on some predetermined basis by a mobile wireless communications device. In this manner, a device listening to the peer discovery signals of other devices can determine which other devices in its vicinity are willing and/or able to perform particular location discovery related operations with very little signaling overhead. The number of bits used in some embodiments to convey cooperation determination abilities may be small, e.g., less than 10 bits in some embodiments. In various exemplary embodiments the number of bits used to indicate location determination abilities and/or willingness to help in a location determination related operation may be less than four bits, e.g., 3, 2 or 1 bit depending on the particular embodiment. Thus, very little overhead is associated with the communication of cooperation determination ability information, e.g., as part of a broadcast discovery signal. Since an advertising device's capability and/or willingness to assist in a location discovery operation is known, signaling to inquire about a device's ability to assist or participate in a location discovery related operation is minimized or avoided altogether.

Various exemplary location determination related operations, in some embodiments, include one or more or all of: providing a past location of the communications device, providing a current location of the communications device, determining a map related parameter used in mobile device location determination, providing location information regarding another mobile device, confirming a location of another mobile device, transmitting a signal used in a round trip timing estimation, serving as a temporary location anchor point and transmitting a reference signal, and serving as a temporary location anchor point and measuring received signals from other mobile devices.

An exemplary method of operating a first mobile communications device to communicate device information, in accordance with some embodiments, comprises: transmitting a peer discovery signal including a predetermined bit designated for use in signaling a willingness to perform a first device location determination related operation, said predetermined bit being set to a first value when said first mobile communications device is willing to perform said first device location determination related operation and being set to a second value when said first mobile communications device is not willing to perform said first device location determination related operation; and monitoring for a signal from a second mobile communications device corresponding to said first device location determination related operation. A exemplary first mobile communications device, in accordance with some embodiments, comprises at least one processor configured to: transmit a peer discovery signal including a predetermined bit designated for use in signaling a willingness to perform a first device location determination related operation, said predetermined bit being set to a first value when said first mobile communications device is willing to perform said first device location determination related operation and being set to a second value when said first mobile communications device is not willing to perform said first device location determination related operation; and monitor for a signal from a second mobile communications device corresponding to said first device location determination related operation. The exemplary first communications device further comprises memory coupled to said at least one processor.

An exemplary method of operating a communications device, in accordance with some embodiments, comprises: transmitting a signal including a first value at a predetermined location in said signal, said first value indicating that the communications device is operating as a location anchor point. The exemplary method further comprises performing at least one of: i) transmitting information indicating the known location of the communications device; or ii) measuring signals received from other devices and reporting the signal measurement information and information indicating the devices from which the measured signals were received to a location determination server. An exemplary communications device, in accordance with some embodiments, comprises: at least one processor configured to: transmit a signal including a first value at a predetermined location in said signal, said first value indicating that the communications device is operating as a location anchor point; and perform at least one of: i) transmitting information indicating the known location of the communications device; or ii) measuring signals received from other devices and reporting the signal measurement information and information indicating the devices from which the measured signals were received to a location determination server. The exemplary communications device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 9 is a drawing illustrating an example in which a mobile wireless communications device transmits a signal indicating its willingness to perform a location determination related operation and then performs a location determination related operation in accordance with an exemplary embodiment.

FIG. 10 is a drawing illustrating another example in which a mobile wireless communications device transmits a signal indicating its willingness to perform a location determination related operation and then performs a location determination related operation in accordance with an exemplary embodiment.

FIG. 11 is a drawing illustrating yet another example in which a mobile wireless communications device transmits a signal indicating its willingness to perform a location determination related operation and then performs a location determination related operation in accordance with an exemplary embodiment.

FIG. 12 is a drawing illustrating still another example in which a mobile wireless communications device transmits a signal indicating its willingness to perform a location determination related operation and then performs a location determination related operation in accordance with an exemplary embodiment.

DETAILED DESCRIPTION

Figure 1:
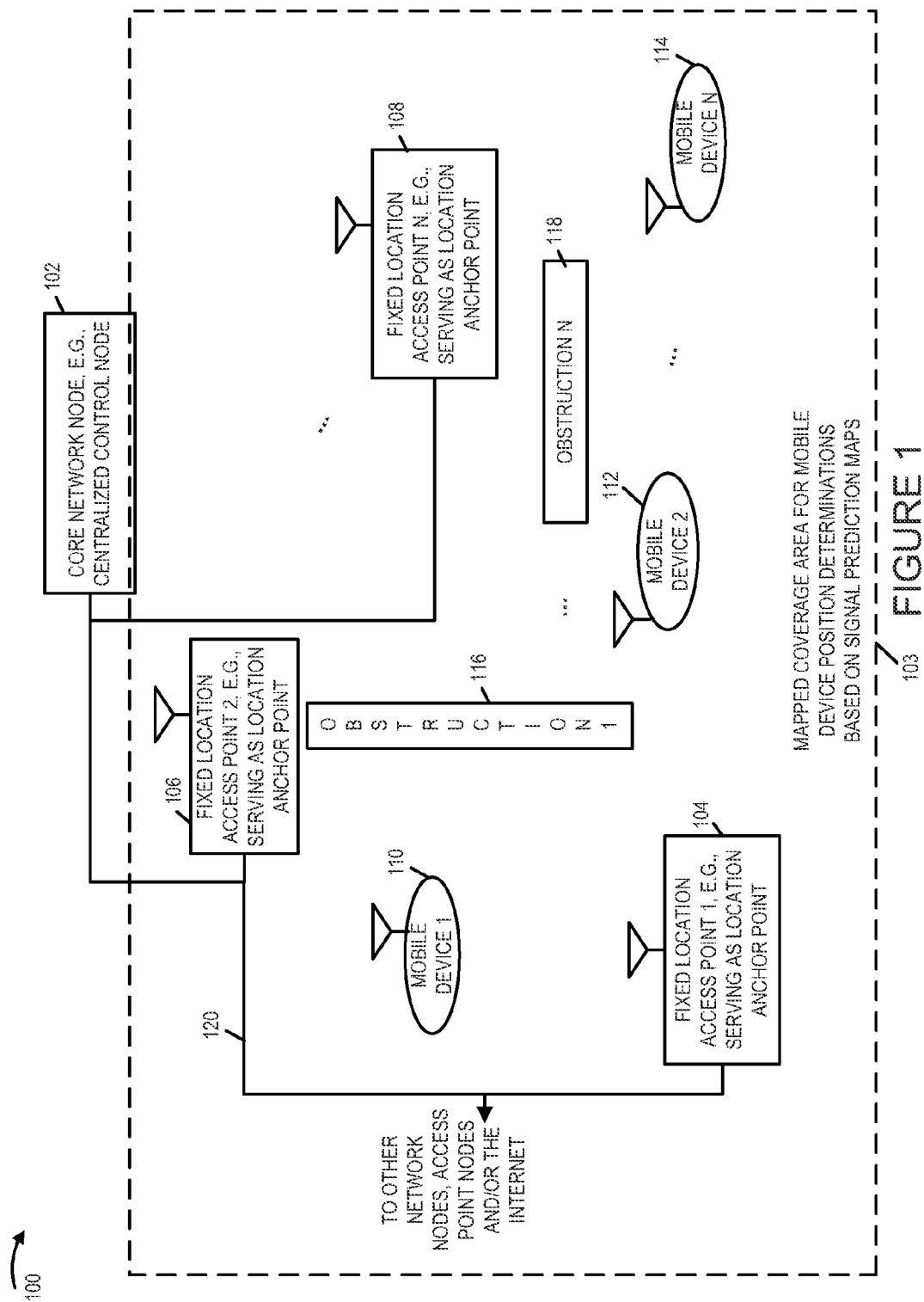
FIG. 1 is a drawing of an exemplary communications system supporting mobile device location determination in accordance with various exemplary embodiments.

FIG. 1 is a drawing of an exemplary communications system 100 including mobile device location determination capability in accordance with various exemplary embodiments. Exemplary system 100 includes a core network node 102, e.g., a centralized control node and/or location determination server node, and a plurality of fixed location access points (access point 1 104, access point 2 106, . . . , access point N 108) coupled together via a backhaul network 120. The fixed location access points (104, 106, . . . , 108) serve as location anchor points in the system. The backhaul network 120 couples the nodes (102, 104, 106, . . . , 108) to one another, to other network nodes and/or to the Internet. There is a mapped coverage area 103 for which mobile device position determinations are performed based on signal prediction maps.

In some embodiments, core network node 102 is located within the coverage area 103. In other embodiments, core network node 102 is located outside the coverage area 103. In still other embodiments, core network node 102 is located on a boundary of the coverage area 103. In yet still other embodiments, the core network node is not included. In some embodiments, at least some of the fixed location access points are not connected via a backhaul network.

Within the coverage area 103, there are a plurality of obstructions (obstruction 1 116, . . . , obstruction N 118). An exemplary obstruction is a wall, which potentially affects signaling between a fixed location access point and a mobile device, e.g., causing attenuation as a signal passes through one or more walls and/or causing attenuation due to diffraction as a signal bends around a corner. Some of the obstruction may be present during some times and not present during other times, e.g., a door may be closed at times creating an obstruction to signaling, but may be open at other times reducing or eliminating the obstruction. In addition, obstructions may be added or deleted over time, e.g., cubicle partitions may be added and/or deleted in a floor plan space of an office building over time.

System 100 also includes a plurality of mobile wireless devices (mobile device 1 110, mobile device 2 112, . . . , mobile device N 114), which may move throughout the system. A mobile device's current position is determined based on signal prediction maps. In some embodiments, a mobile device determines its position based on signal prediction map information and signal measurement information. In some embodiments, another node, e.g. a location determination server node, determines a mobile device's position based on signal prediction map information and signal measurement information.

In various embodiments, a peer to peer signaling protocol is used for the wireless signaling. The mobile communications devices (110, 112, . . . , 114) can, and sometimes does, participate in cooperative location discovery operations. A mobile communications device, e.g., mobile node 110, advertises its willingness to participate in one or more cooperative location discovery operations using one or more predetermined bits in a peer discovery signal. For example, a header of a peer discovery signal, in some embodiments, includes a plurality of predetermined bits corresponding to different location determination related operations. In some such embodiments, the mobile communications device controls setting of the predetermined bits corresponding to different location determination operations to indicate its willingness or lack thereof to perform the various possible location determination related operations which are supported.

Various exemplary location determination related operations include: (i) transmitting, e.g., broadcasting, information indicating a current or past location of the mobile communications device, (ii) performing a map parameter determination operation, e.g., based on measurements of received signals, (iii) providing location information in response to a received signal from another mobile device, and (iv) transmitting a signal used to make a round trip timing determination.

Figure 2:
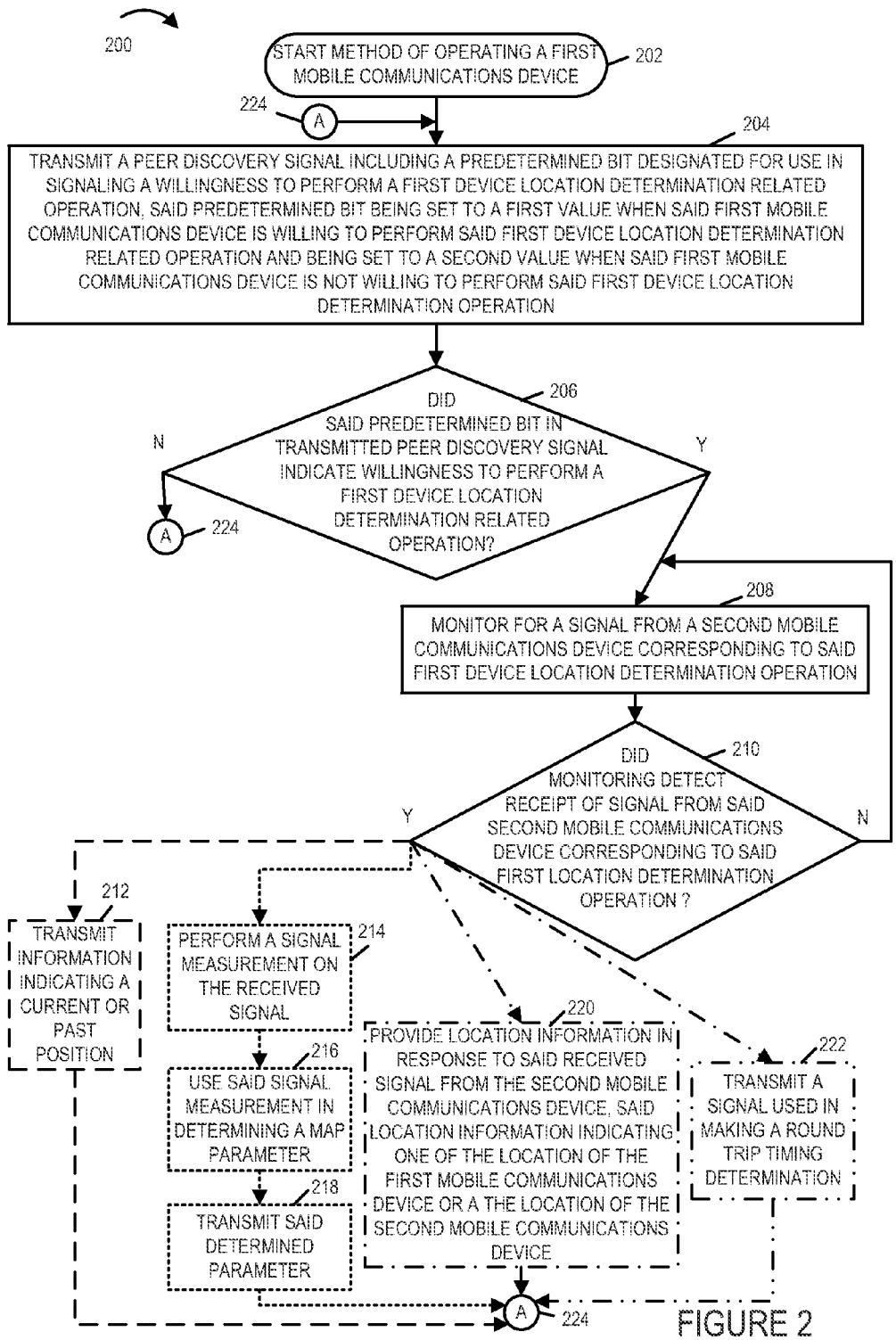
FIG. 2 is a drawing of a flowchart of an exemplary method of operating a first mobile communications device in accordance with various embodiments.

FIG. 2 is a drawing of a flowchart 200 of an exemplary method of operating a first mobile communications device, e.g., a battery powered handheld wireless mobile node supporting peer to peer signaling, in accordance with various embodiments. Operation of the exemplary method starts in step 202, where the first mobile communications device is powered on and initialized. Operation proceeds from start step 202 to step 204.

In step 204 the first mobile communications device transmits a peer discovery signal including a predetermined bit designated for use in signaling a willingness to perform a first device location determination related operation, said predetermined bit being set to a first value when said first mobile communications device is willing to perform said first device location determination related operation and being set to a second value when said first device is not willing to perform said first device location determination related operation. Operation proceeds from step 204 to step 206.

In step 206, the first mobile communications device controls operation as a function of said predetermined bit in said the transmitted peer discovery signal. If the predetermined bit in the transmitted peer discovery signal indicated a willingness to perform a first device location determination related operation, then operation proceeds from step 206 to step 208; otherwise operation proceeds from step 206 to the input of step 204, via connecting node A 224.

Returning to step 208, in step 208 the first mobile communications device monitors for a signal from a second mobile communications device corresponding to said first device location determination related operation. Operation proceeds from step 208 to step 210. In step 210 the first mobile communications device checks if the monitoring of step 208 detected receipt of a signal from the second mobile communications device corresponding to said first device location determination related operation. If the monitoring of step 208 detected receipt of a signal from the second mobile communications device corresponding to said first device location determination related operation, then operation proceeds from step 210 to one or more or all of steps 212, 214, 220 and 222; otherwise operation proceeds from step 210 to step 218 for additional monitoring.

In some embodiments, the first device location determination related operation may be, and sometimes is, supplying a position fix of the current or past location of the first communications device. Returning to step 212, in step 212 the first mobile communications device transmits information indicating a current or past position. Operation proceeds from step 212 via connecting node A 224 to step 204.

In some embodiments, the first device location determination related operation may be, and sometimes is, a map parameter determination operation. Returning to step 214, in step 214 the first mobile communications device performs a signal measurement on the received signal. In some embodiments, the received signal from the second mobile communications device is a signal transmitted by the second mobile communications device in response to receipt of said transmitted peer discovery signal. Then in step 216, the first mobile communications device used said signal measurement in determining a map parameter. In some embodiments, the map parameter indicates the presence or absence of a physical obstruction, e.g., a door or a movable partition, at a location on said map. Other exemplary map parameters include, e.g., a specific wall material, the presence of a crowd, a state to describe whether a door is open or closed. Operation proceeds from step 216 to step 218 in which the first mobile communications device transmits said determined parameter, e.g., to a second mobile communications device or to another device such as a location determination server. Operation proceeds from step 218 via connecting node A 224 to step 204.

In some embodiments, the first device location determination related operation may be, and sometimes is, a first type of position ambiguity resolution operation. Returning to step 220, in step 220 the first mobile communications device provides location information in response to said received signal from the second mobile communications device, said location information indicating one of a location of the first mobile communications device or a location of the second mobile communications device. Operation proceeds from step 220, via connecting node A 224, to step 204.

In some embodiments, the first device location determination related operation may be, and sometimes is, a second type of position ambiguity resolution operation. Returning to step 222, in step 222 the first mobile communications device transmits a signal used in making a round trip timing determination. Operation proceeds from step 222, via connecting node A 224, to step 204.

In various embodiments, the first mobile communications device advertises in a peer discovery signal its willingness to participate in a cooperative location discovery operation using one or more predetermined bits, e.g., in the header of a peer discovery signal, with the predetermined bits corresponding to different discovery operations. For example, a first predetermined bit, in some embodiments, corresponds to the operation of step 212, a second predetermined bit, in some embodiments, corresponds to the operations of steps 214, 216 and 218, a third predetermined bit corresponds to the operation of step 220 and a fourth predetermined bit corresponds to the operation of step 222. At different times different bits may be set and the first mobile communications may perform different location determination related operations for other mobile devices, e.g. in accordance with its current bit settings.

In some embodiments, the transmitted peer discovery signal from the first communications device is a broadcast advertisement for cooperative location determination related operations, e.g., an advertisement intended to initiate a sequence of events to provide a cooperative location determination related operation or operations. In some such embodiments, the monitored signal from the second communications device is a peer to peer paging signal from the second communications device directed to the first communications device in response to the peer discovery signal. In some such embodiments, a location determination related operation, e.g., proving mobile location information, providing a location map parameter, providing a device position confirmation, or providing a signal used for a round trip timing measurement, is communicated during a peer to peer traffic interval. In some such embodiments, the first and second mobile communications devices implement a peer to peer signaling protocol including a recurring peer to peer timing structure including: a peer discovery interval, a peer to peer paging interval and a peer to peer traffic interval.

Figure 3:
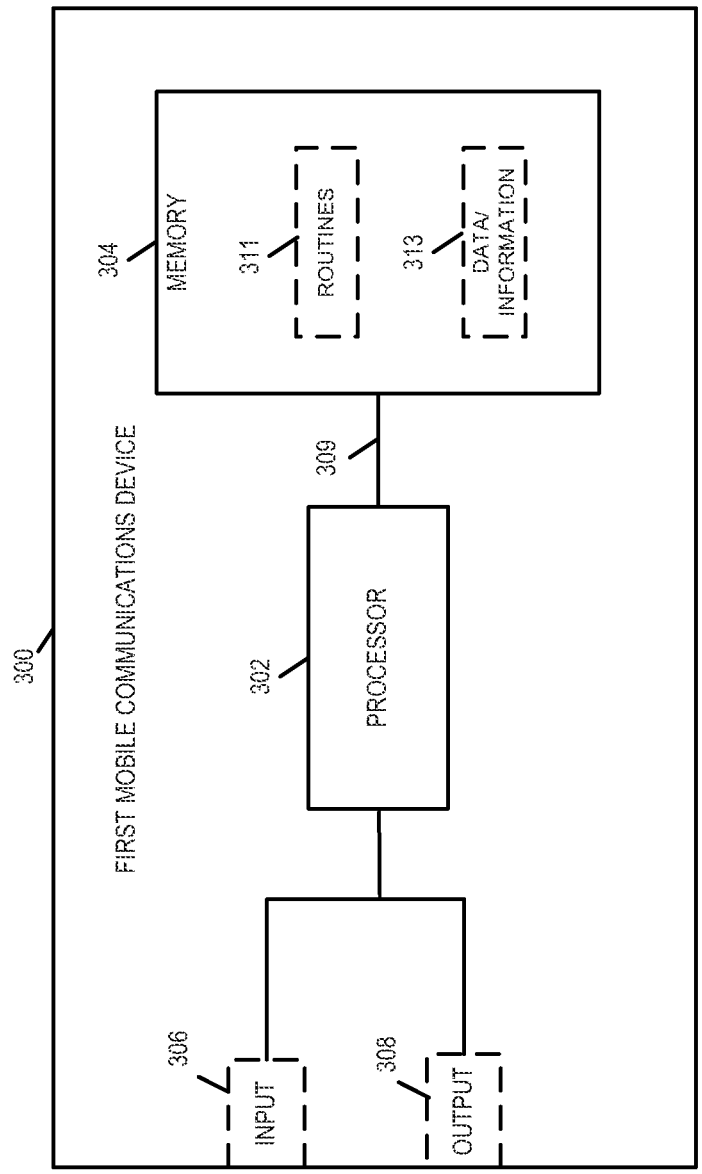
FIG. 3 is a drawing of an exemplary first mobile communications device in accordance with an exemplary embodiment.

FIG. 3 is a drawing of an exemplary first mobile communications device 300 in accordance with an exemplary embodiment. Exemplary first mobile wireless device 300 is, e.g., one of the mobile devices of system 100 of FIG. 1. Exemplary first mobile communications device 300 may, and sometimes does, implement a method in accordance with flowchart 200 of FIG. 2.

First mobile communications device 300 includes a processor 302 and memory 304 coupled together via a bus 309 over which the various elements (302, 304) may interchange data and information. First mobile communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output. In some embodiments, memory 304 includes routines 311 and data/information 313.

In various embodiments, processor 302 is configured to transmit a peer discovery signal including a first predetermined bit designated for use in signaling a willingness to perform a first device location determination related operation, said at least one predetermined bit being set to a first value when said mobile communications device is willing to perform said first device location determination related operation and being set to a second value when said mobile communications device is not willing to perform said first device location determination related operation; and monitor for a signal from a second mobile communications device corresponding to said first device location determination related operation. In some such embodiments, processor 302 is further configured to: transmit information indicating a current or past position, e.g., a current or past position of first mobile communications device 300.

In some embodiments, said first device location determination related operation is a map parameter determination operation. In some such embodiments, processor 302 is further configured to: perform a signal measurement on the received signal; and use said signal measurement in determining said map parameter; when said monitoring for a signal from a second mobile communications device detects receipt of a signal from the second mobile communications device corresponding to said first device location determination related operation. In various embodiments, said signal from the second mobile communications device is a signal transmitted by said second mobile communications device in response to receipt of said transmitted peer discovery signal.

In some such embodiments, said parameter indicates the presence or absence of a physical obstruction, e.g., door or movable partition, at a location on a map. In some embodiments, processor 302 is further configured to transmit said determined parameter, e.g., e.g. to the second mobile communications device or some other device such as a location determination server.

In some embodiments, the first device location determination related operation is a position ambiguity resolution operation. In some such embodiments, processor 302 is further configured to: provide location information in response to a signal from said second device, said location information indicating one of the location of the first device or the location of the second device.

In some embodiments, the first device location determination related operation is a position ambiguity resolution operation. In some such embodiments, processor 302 is further configured to: transmit a signal used in making a round trip timing determination, when said monitoring for a signal from a second mobile communications device detects receipt of a signal from the second mobile communications device corresponding to said first device location determination related operation.

Figure 4:
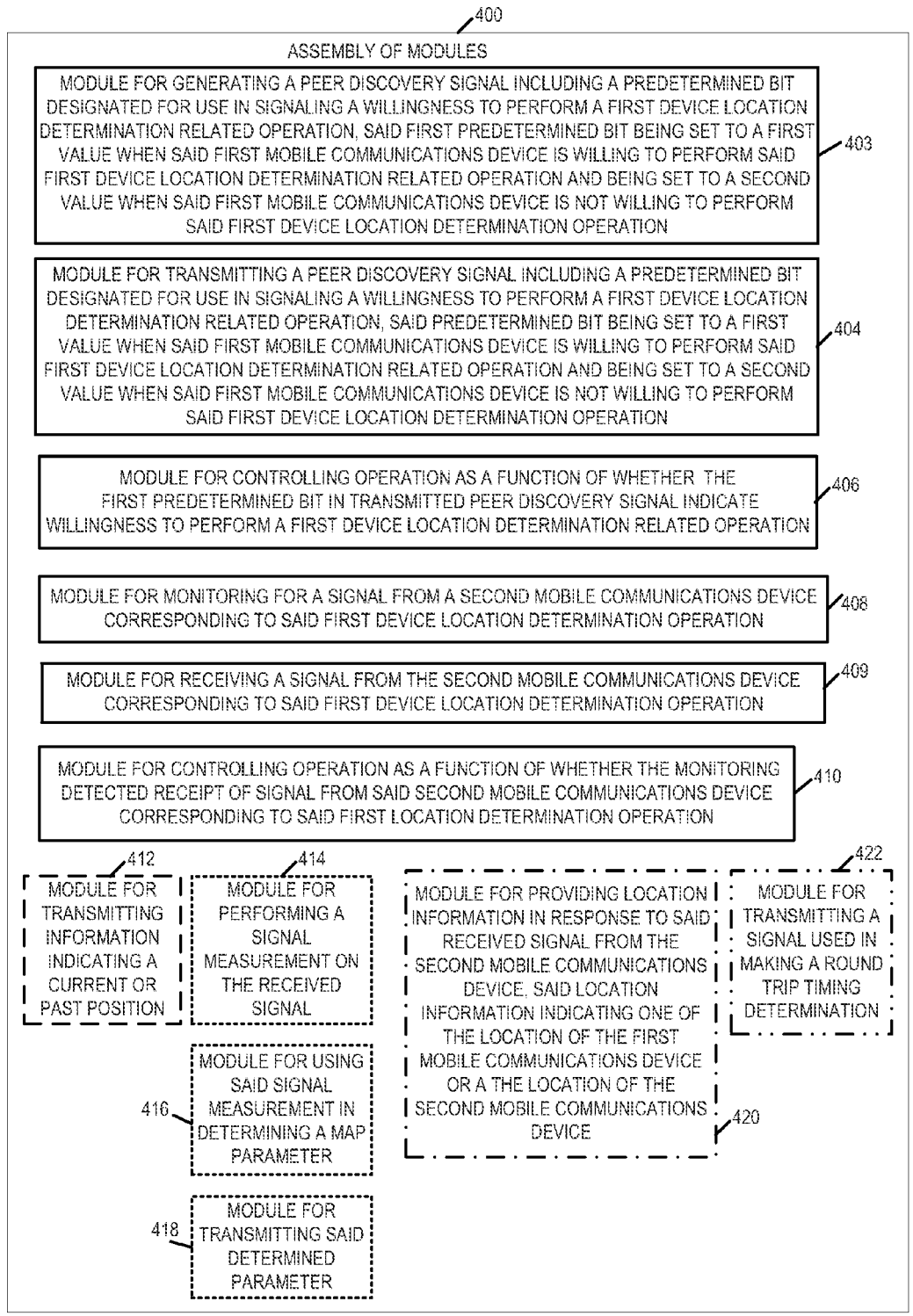
FIG. 4 is an assembly of modules which can, and in some embodiments is, used in the exemplary first mobile communications device illustrated in FIG. 3.

FIG. 4 is an assembly of modules 400 which can, and in some embodiments is, used in the exemplary first mobile communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of first mobile communications device 300 shown in FIG. 3. In some such embodiments, the assembly of modules 400 is included in routines 311 of memory 304 of device 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the first mobile communications device 300 or elements therein such as the processor 302, to perform the functions of the corresponding steps illustrated and/or described in the method of flowchart 200 of FIG. 2.

Assembly of modules 400 includes a module 403 for generating a peer discovery signal including a predetermined bit designated for use in signaling a willingness to perform a first device location determination related operation, said first predetermined bit being set to a first value when said first mobile communications device is willing to perform said first device location determination related operation and being set to a second value when said first mobile communications device is not willing to perform said first device location determination related operation, and a module 404 for transmitting a peer discovery signal including a predetermined bit designated for use in signaling a willingness to perform a first device location determination related operation, said first predetermined bit being set to a first value when said first mobile communications device is willing to perform said first device location determination related operation and being set to a second value when said first mobile communications device is not willing to perform said first device location determination related operation. Assembly of modules 400 further includes a module 406 for controlling operation as a function of whether the predetermined bit in the transmitted peer discovery signal indicates a willingness to perform a first device location determination related operation, a module 408 for monitoring for a signal from a second mobile communications device corresponding to said first device location determination related operation, a module 409 for receiving a signal from the second mobile communications device corresponding to said first device location determination related operation, and a module 410 for controlling operation as a function of whether the monitoring detected receipt of signal from the second mobile communications device corresponding to said first device location determination related operation.

Assembly of modules 400 further includes a module 412 for transmitting information indicating a current or past position, a module 414 for performing a signal measurement on the received signal, a module 416 for using said signal measurement in determining a map parameter, a module 418 for transmitting said determined parameter, a module 420 for providing location information in response to said received signal from the second mobile communications device, said location information indicating one of the location of the first mobile communications device or a location of the second mobile communications device and a module 422 for transmitting a signal used in making a round trip timing determination.

Figure 5:
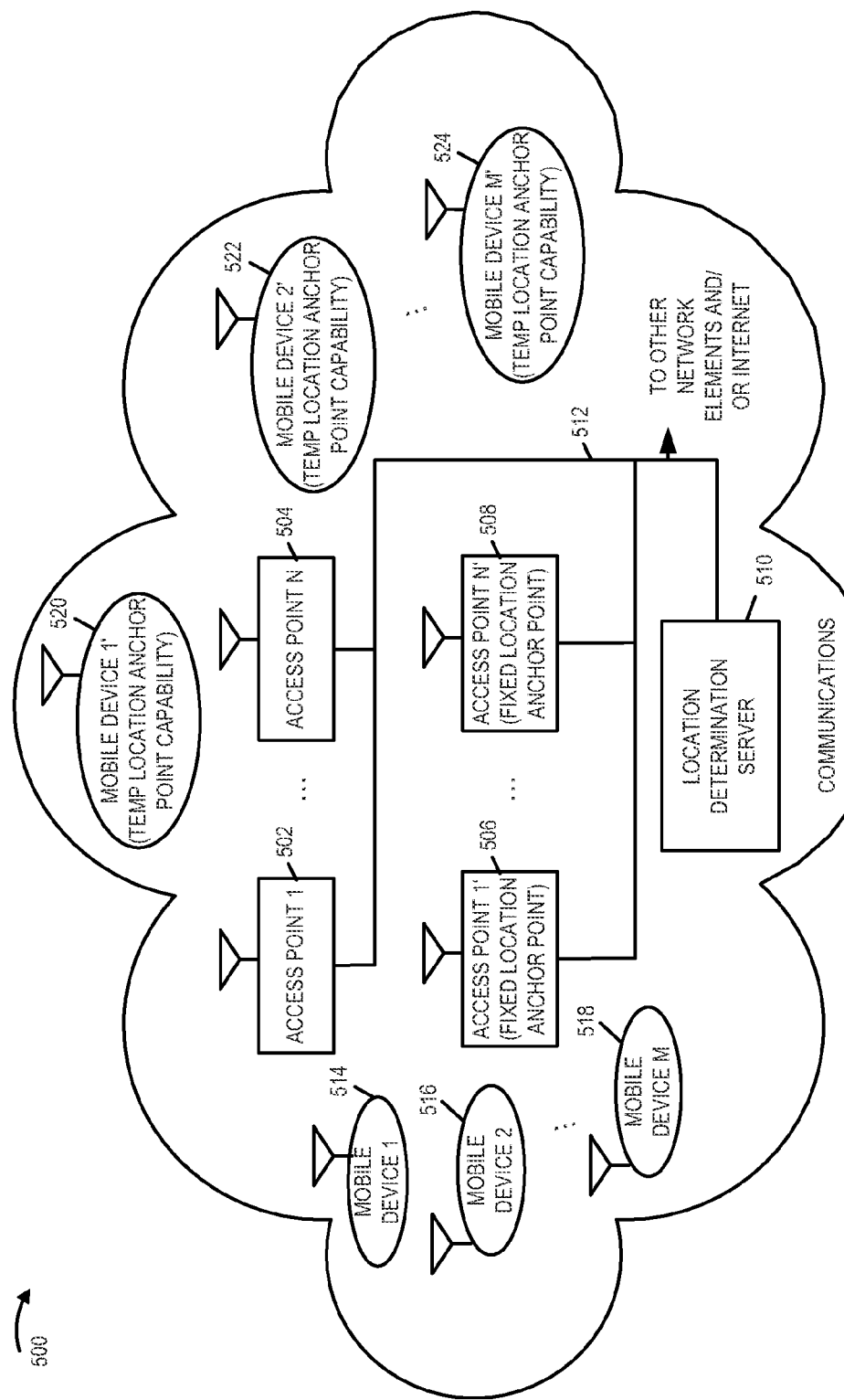
FIG. 5 is a drawing of an exemplary communication system in which mobile devices can, and sometimes do, serve as temporary location anchor points in accordance with an exemplary embodiment.

FIG. 5 is a drawing of an exemplary communication system 500, e.g. a wireless communications system, in accordance with an exemplary embodiment. Exemplary communications system 500 includes a plurality of access points (access point 1 502, . . . , access point N 504) which do not serve as location anchor points, a plurality of access points (access point 1' 506, . . . , access point N' 508) which serve as fixed location anchor points and a location determination server, which are coupled together via a backhaul network 512. The backhaul network is also coupled to other network elements and/or the Internet.

Exemplary communications system 500 also includes a plurality of mobile devices, e.g., mobile wireless terminals, which do not include the capability to serve as a temporary location anchor point (mobile device 1 514, mobile device 2 516, . . . , mobile device M 518. Exemplary communications system 500 also includes a plurality of mobile devices, e.g., mobile wireless terminals, which can and sometimes do, serve a temporary location anchor points (mobile device 1' 520, mobile device 2' 522, . . . mobile device M' 524).

In some embodiments, the wireless communications devices (502, . . . , 504, 506, . . . , 508, 514, 516, . . . , 518, 520, 522, . . . , 524) support a peer to peer signaling protocol and can communicate with one another directly. In some such embodiments, two mobile communications devices may, and sometimes do, communicate directly with one another without the signaling traversing an access point. In some embodiments, the location determination server is not included. In some embodiments, an access point serves as a location determination server node. In some embodiments, each of the access points are fixed location anchor points. In various embodiments, each of the mobile devices includes temporary location anchor point capability. In some embodiments at least some of the access points are not interconnected via a backhaul network. In some embodiments, there is no backhaul network.

In various embodiments, a mobile device with the capability to serve as a temporary location anchor point, e.g., mobile device 1' 520 advertises information indicating that the mobile device is operating temporarily as a location anchor point. In some embodiments, when a mobile device is operating as a temporary location anchor point it transmits a signal including at first value at a predetermined location indicating that the communications device is operating as a location anchor point. In some embodiments, the transmitted signal is a peer discovery signal. In some such embodiments, the peer discovery signal includes a header, and one bit in the header field is used to indicate that the communications device is operating as a location anchor point. In some embodiments, operating as a temporary location anchor point includes transmitting information indicating the known location of the communications device, e.g., intended to be received and used by other mobile device to determine their position. In some embodiments, operating as a temporary location anchor point includes measuring signals received from other devices, e.g., other mobile nodes, and reporting the signal measurement information and information indicating the devices from which the signals were received to a location determination server.

Figure 6:
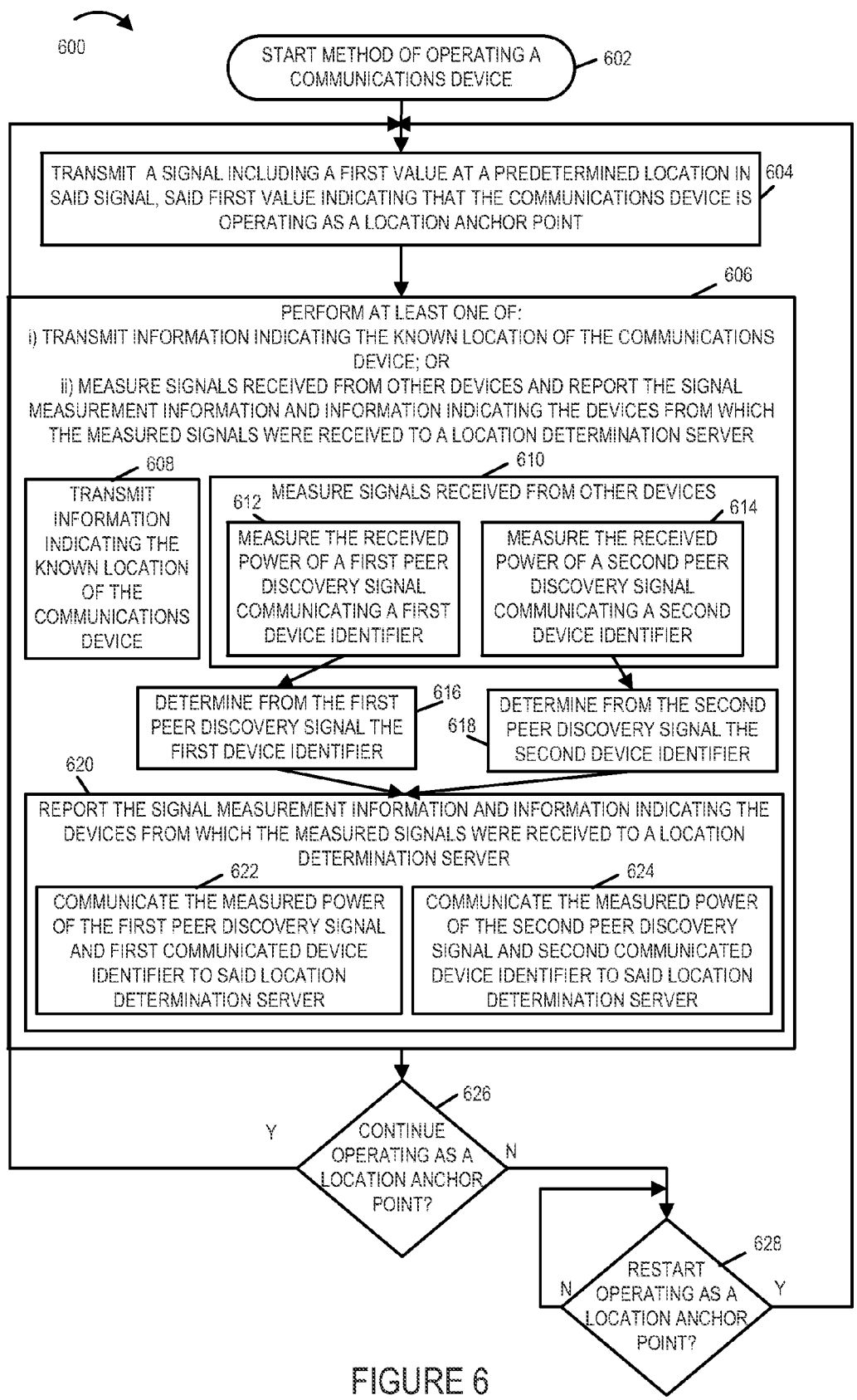
FIG. 6 is a flowchart of an exemplary method of operating a communications device, e.g., a mobile communications device, in accordance with various embodiments.

FIG. 6 is a flowchart 600 of an exemplary method of operating a communications device, e.g., a mobile communications device, in accordance with various embodiments. The exemplary mobile device is, e.g., one of the mobile devices (520, 522, . . . , 524) with temporary location anchor point capability of system 500 of FIG. 5. Operation of the exemplary method starts in step 602, where the communications device is powered on and initialized. Operation proceeds from start step 602 to step 604. In step 604, the communications device transmits a signal including a first value at a predetermined location in said signal, said first value indicating that said communications device is operating as a location anchor point. Operation proceeds from step 604 to step 606. In step 606 the communications device performs at least one of: i) transmitting information indicating the known location of the communications device; or ii) measuring signals received from other devices and reporting the signal measurement information and information indicating the devices from which the measured signal were received to a location determination server. Step 606 includes steps 608, 610, 612, 614, 616, 618, 620 622 and 624. In one embodiment, step 608 is performed. In another embodiment, steps 610, 612, 614, 616, 618, 620, 622 and 624 are performed. In still another embodiment, steps 608, 610, 612, 614, 616, 618, 620 622 and 624 are performed. In yet another embodiment, step 608 is performed during one iteration of the flow including step 604 and step 608; and steps 610, 612, 614, 616, 618, 620, 622 and 624 are performed during another iteration of the flow including step 604 and step 606.

In step 608 the communications device transmits information indicating the known location of the communications device. In some embodiments, the said information indicating the known location of the communications device includes a second value identifying one of a plurality of predetermined locations, said one of the plurality of predetermined locations being the location of the communications device. In some embodiments, the known location is a predetermined anchor point location from a set of possible anchor point locations, e.g., anchor point location 2 where location 2 corresponds to a predetermined map or floor plan location.

In step 610 the communications device measures signals received from other devices. Step 610 includes steps 612 and 614, which may be performed serially or in parallel. In step 612 the communications device measures the received power of a first peer discovery signal communicating a first device identifier. Operation proceeds from step 612 to step 616. Returning to step 614, in step 614, the communications device measures the received power of a second peer discovery signal communicating a second device identifier. Operation proceeds from step 614 to step 618.

Returning to step 616, in step 616 the communications device determines from the first peer discovery signal the first device identifier. Returning to step 618, in step 618 the communications device determines from the second peer discovery signal the second device identifier. Operation proceeds from steps 616 and 618 to step 620.

In step 620 the communications device reports the signal measurement information and information indicating the devices from which the measured signals were received to a location determination server. Step 620 includes steps 622 and 624, which may be performed serially or in parallel. In step 622 the communications device communicates the measured power of the first peer discovery signal and the first communicated device identifier to said location determination server. In step 624, the communications device communicates the measured power of the second peer discovery signal and the second communicated device identifier to said location determination server.

In some embodiments the first and second peer discovery signals are received during the same peer discovery interval, and the reporting of the measured signal power information and corresponding device identifiers to said location determination server occur after the discrete peer discovery time interval in which peer discovery signals are received. In some embodiments, a peer to peer timing structure is implemented including a peer discovery time interval and a corresponding time interval for reporting signal power measurement and corresponding device identifiers to said location determination server. In some such embodiments, for each peer discovery interval, there is a corresponding reporting interval. In some embodiments, there are a predetermined number of peer discovery time intervals corresponding to each reporting interval, wherein said predetermined number is greater than 1.

Operation proceeds from step 606 to step 626. In step 626 the communications device decides if it is to continue operating as location anchor point. If the communications device determines that it is to continue operating as a location anchor point, then operation proceeds from step 626 to step 604. However, if the communications device determines that it is not to continue operating as a location anchor point then operation proceeds from step 626 to step 628. In various embodiments, the communications device makes the decision of step 626 whether or not to continue operating as a location anchor point as a function of one or more of: time remaining in a time interval in which the communications device has agreed to operate as a location anchor point, a number of detected peer devices in its vicinity, a level of peer to peer communications in its vicinity, an amount of remaining battery power, a number of other devices which can be detected which also are currently acting as location anchor points, a request to continue operating as a location anchor point, a command to continue operating as a location anchor point, motion of the communications device, and a change in its current location, e.g., to outside a specified location anchor point designated region.

In step 628 the communications device decides if it should restart operating as a location anchor point. If the communications device determines that it should restart operating as a location anchor point, then operation proceeds from step 628 to step 604; otherwise operation proceeds from the output of step 628 to the input of step 628 for another check if it should restart operating as a location anchor point. In various embodiments, the communications device makes the decision of step 628 whether or not to restart operating as a location anchor point as a function as a function of one or more of: a received request to operate as a location anchor point, a received command to start operating as a location anchor point, a number of detected peer devices in its vicinity, a level of peer to peer communications in its vicinity, an amount of remaining battery power, a number of other devices which can be detected which also are currently acting as location anchor points, a request to restart operating as a location anchor point, a change in its status from motion to stationary, a change in its current location, e.g., to within a specified location anchor point designated region, current time matching a predetermined time for which the communications device is commanded or requested to start operating as a location anchor point.

Figure 7:
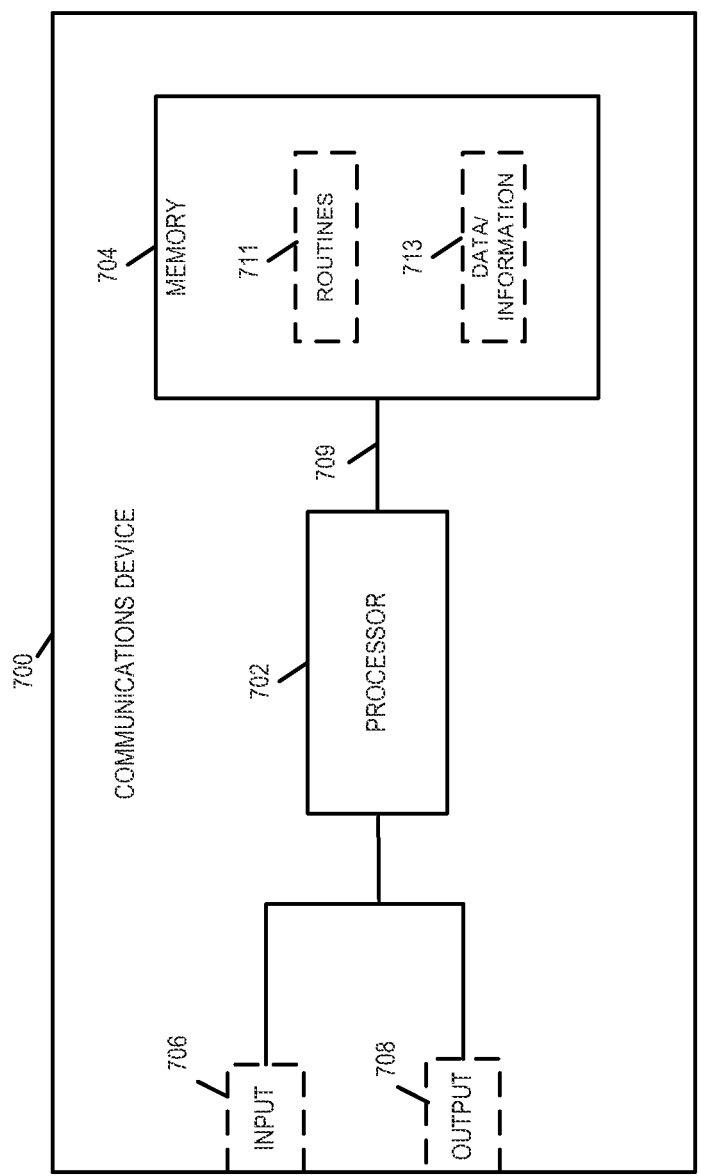
FIG. 7 is a drawing of an exemplary first mobile communications device in accordance with an exemplary embodiment.

FIG. 7 is a drawing of an exemplary communications device 700, e.g., a mobile communications device supporting peer to peer signaling, in accordance with an exemplary embodiment. Exemplary communications device 700 is, e.g., one of the mobile devices (520, 522, . . . , 524) with temporary location anchor point capability of system 500 of FIG. 5. Exemplary communications device 700 may, and sometimes does, implement a method in accordance with flowchart 600 of FIG. 6.

Communications device 700 includes a processor 702 and memory 704 coupled together via a bus 709 over which the various elements (702, 704) may interchange data and information. Communications device 700 further includes an input module 706 and an output module 708 which may be coupled to processor 702 as shown. However, in some embodiments, the input module 706 and output module 708 are located internal to the processor 702. Input module 706 can receive input signals. Input module 706 can, and in some embodiments does, include a wireless receiver and/or a wired or optical input interface for receiving input. Output module 708 may include, and in some embodiments does include, a wireless transmitter and/or a wired or optical output interface for transmitting output. In some embodiments, memory 704 includes routines 711 and data/information 713.

In various embodiments, processor 702 is configured to: transmit a signal including a first value at a predetermined location in said signal, said first value indicating that the communications device is operating as a location anchor point; and perform at least one of: i) transmitting information indicating the known location of the communications device; or ii) measuring signals received from other devices and reporting the signal measurement information and information indicating the devices from which the measured signals were received to a location determination server. In some embodiments, processor 702 is configured to transmit information indicating the known location of the communications device; and said information includes a second value identifying one of a plurality of predetermined locations, said one of the plurality of predetermined locations being the location of said communications device. In various embodiments, the known location is a predetermined anchor point location from a set of possible anchor point locations, e.g. anchor point location 2 where location 2 corresponds to a predetermined map/floor location.

In some embodiments, the communications device 700 is a mobile communications device. For example, communications device 700 is a handheld battery powered mobile node supporting peer to peer communications which may, and sometimes does, serve as a temporary location anchor point.

Processor 702, in some embodiments, is configured to measure signals received from other devices and report the signal measurement information and information indicating the devices from which the measured signals were received, and processor 702 is configured to measure the received power of a first peer discovery signal communicating a first device identifier, as part of being configured to measure signals. In some such embodiments, processor 702 is further configured to: determine from the first peer discovery signal the first communicated device identifier.

Processor 702, in various embodiments, is configured to communicate the measured received power of the first peer discovery signal and said first communicated device identifier to said location determination server, as part of being configured to report the signal measurement information and information indicating the devices from which the measured signals were received. In some such embodiments, processor 702 is further configured to: measure the received power of a second peer discovery signal communicating a second device identifier, and processor 702 is configured to communicate the measured received power of the second peer discovery signal and said second communicated device identifier to said location determination server, as part of being configured to report the signal measurement information and information indicating the devices from which the measured signals were received.

In various embodiments, the first and second peer discovery signals are received during the same peer discovery interval, and processor 702 is configured to report the measured received signal power information and corresponding device identifiers to said location determination server after the discrete discovery time interval in which peer to peer discovery signals are received. In some embodiments, corresponding to each peer discovery interval there is a corresponding interval for reporting measured signal power measurement information and corresponding device identifiers to said location determination server.

Figure 8:
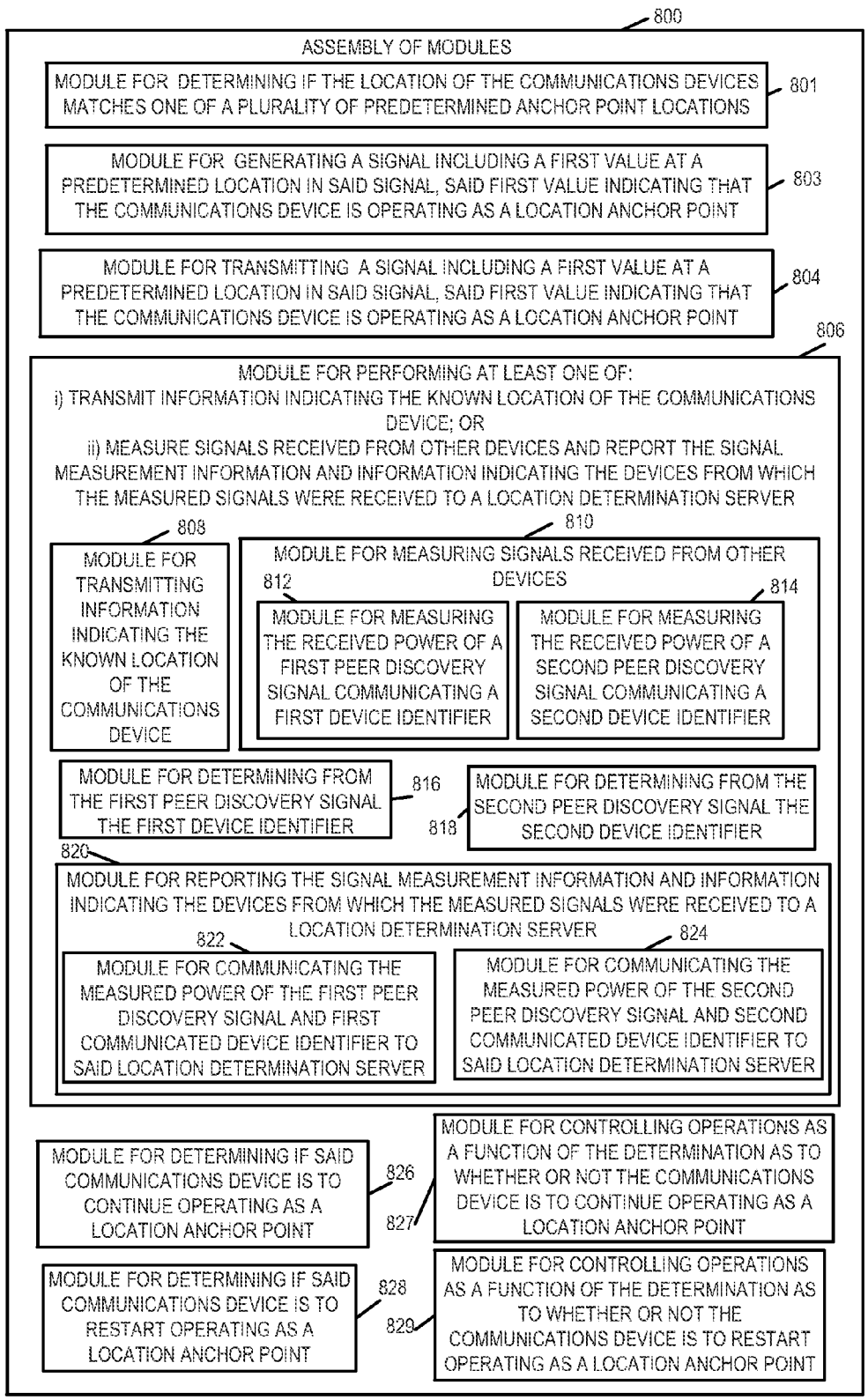
FIG. 8 is an assembly of modules which can, and in some embodiments is, used in the exemplary first mobile communications device illustrated in FIG. 7.

FIG. 8 is an assembly of modules 800 which can, and in some embodiments is, used in the exemplary communications device 700 illustrated in FIG. 7. The modules in the assembly 800 can be implemented in hardware within the processor 702 of FIG. 7, e.g., as individual circuits. Alternatively, the modules may be implemented in software and stored in the memory 704 of communications device 700 shown in FIG. 7. In some such embodiments, the assembly of modules 800 is included in routines 711 of memory 704 of device 700 of FIG. 7. While shown in the FIG. 7 embodiment as a single processor, e.g., computer, it should be appreciated that the processor 702 may be implemented as one or more processors, e.g., computers. When implemented in software the modules include code, which when executed by the processor, configure the processor, e.g., computer, 702 to implement the function corresponding to the module. In some embodiments, processor 702 is configured to implement each of the modules of the assembly of modules 800. In embodiments where the assembly of modules 800 is stored in the memory 704, the memory 704 is a computer program product comprising a computer readable medium, e.g., a non-transitory computer readable medium, comprising code, e.g., individual code for each module, for causing at least one computer, e.g., processor 702, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the communications device 700 or elements therein such as the processor 702, to perform the functions of the corresponding steps illustrated and/or described in the method of flowchart 600 of FIG. 6.

Assembly of modules 800 includes a module 801 for determining if the current location of the communications device matches one of a plurality of predetermined anchor point locations, a module 803 for generating a signal including a first value at a predetermined location in said signal, said first value indicating that the communications device is operating as a location anchor point, a module 804 for transmitting a signal including a first value at a predetermined location in said signal, said first value indicating that the communication device is operating as a location anchor point, a module 806 for performing at least one of: i) transmitting information indicating the known location of the communications device; or ii) measuring signals received from other devices and reporting the signal measurement information and information indicating the devices from which the measured signals were received to a location determination server, a module 826 for determining if the communications device is to continue operating as a location anchor point, a module 827 for controlling operations as a function of the determination as to whether or not the communications device is to continue operating as a location anchor point, a module 828 for determining if said communications device is to restart operating as a location anchor point and a module 829 for controlling operations as a function of the determination as to whether or not the communications device is to restart operating as a location anchor point.

Module 806 includes a module 808 for transmitting information indicating the known location of the communications device, and a module 810 for measuring signals received from other devices. Module 810 includes a module 812 for measuring the received power of a first peer discovery signal communicating a first device identifier and a module 814 for measuring the received power of a second peer discovery signal communicating a second device identifier. Module 806 further includes a module 816 for determining from the first peer discovery signal the first device identifier, a module 818 for determining form the second peer discovery signal the second device identifier, and a module 820 for reporting the signal measurement information and information indicating the devices from which the measured signals were received to a location determination server. Module 820 includes a module 822 for communicating the measured power of the first peer discovery signal and the first communicated device identifier to said location determination server and a module 824 for communicating the measured power of the second peer discovery signal and second communicated device identifier to said location determination server.

In the assembly of modules 800, some of the modules are shown as being included internal to other modules. In some embodiments, one or more or all of the modules shown as being included within other modules may be standalone modules.

FIG. 9 is a drawing 900 illustrating an example in which a mobile wireless communications device transmits a signal indicating its willingness to perform a location determination related operation and then performs a location determination related operation in accordance with an exemplary embodiment. Mobile device 1 902 generates and transmits peer discovery signal 906. Peer discovery signal 906 includes information 908 including a header field in which Bit $1_{LRD0}$ has been set equal to 1 indicating that mobile device 1 is willing to perform a first type of location determination related operation.

The transmitted peer discovery signal 906 is received and recovered by mobile device 2 904. Mobile device 2 904 generates signal 910 including a request for the current and/or past location of mobile device 1 912. Mobile device 1 902 monitors for receipt of signals from other mobile devices corresponding to its offer to perform the first type of location determination related determination operation. Mobile device 1 902 receives and recovers signal 910. Mobile device 1 902 generates and transmits signal 914 communicating information 916 indicating the current and/or past position of mobile device 1. Mobile device 2 904 receives signal 914 and recovers the information 916. Mobile device 2 904 uses the recovered information to estimate its own past and/or current position.

FIG. 10 is a drawing 1000 illustrating another example in which a mobile wireless communications device transmits a signal indicating its willingness to perform a location determination related operation and then performs a location determination related operation in accordance with an exemplary embodiment. In this example, there is an obstruction 1002, which is a door which may be open or closed at different times, and the door is at a known location on a gridmap which is stored in the mobile devices. Mobile device 1 902 generates and transmits peer discovery signal 1004. Peer discovery signal 1004 includes information 1006 including a header field in which Bit $2_{LRD0}$ has been set equal to 1 indicating that mobile device 1 902 is willing to perform a second type of location determination related operation.

The transmitted peer discovery signal 1004 is received and recovered by mobile device 2 904. Mobile device 2 904 generates signal 1008 including a request for a map parameter which identifies if the door 1002 is open or closed at the current time 1010. Mobile device 1 902 monitors for receipt of signals from other mobile devices corresponding to its offer to perform the second type of location determination related determination operation. Mobile device 2 904 receives and recovers signal 1008. Mobile device 1 902 performs a signal measurement on the received signal, e.g., a power measurement, and uses the signal measurement in determining the requested map parameter. In this example, consider that mobile device 1 902 determines that the door 1002 is open. Mobile device 1 902 generates and transmits signal 1012 communicating information indicating that the door is open. Mobile device 2 904 receives signal 1012 and recovers the information 1014. Mobile device 2 904 updates the communicated parameter indicating the status of the door. Mobile device 2 904 subsequently uses the updated parameter in performing a position determination of its location.

FIG. 11 is a drawing 1100 illustrating yet another example in which a mobile wireless communications device transmits a signal indicating its willingness to perform a location determination related operation and then performs a location determination related operation in accordance with an exemplary embodiment. Mobile device 1 902 generates and transmits peer discovery signal 1102. Peer discovery signal 1102 includes information 1104 including a header field in which Bit $3_{LRD0}$ has been set equal to 1 indicating that mobile device 1 is willing to perform a third type of location determination related operation.

The transmitted peer discovery signal 1102 is received and recovered by mobile device 2 904. Mobile device 2 904 generates signal 1106 including a request for the mobile node 1's estimation of the current position of mobile device 2 1108. Mobile device 1 902 monitors for receipt of signals from other mobile devices corresponding to its offer to perform the third type of location determination related determination operation. Mobile device 1 902 receives and recovers signal 1108. Mobile device 1 902 generates and transmits signal 1110 communicating information 1112 indicating mobile device 1's estimation of the current position of mobile device 2. Mobile device 2 902 receives signal 1110 and recovers the information 1112. Mobile device 2 904 uses the recovered information to validate and/or update its estimation of its current position.

FIG. 12 is a drawing 1200 illustrating still another example in which a mobile wireless communications device transmits a signal indicating its willingness to perform a location determination related operation and then performs a location determination related operation in accordance with an exemplary embodiment. Mobile device 1 902 generates and transmits peer discovery signal 1202. Peer discovery signal 1202 includes information 1204 including a header field in which Bit $4_{LRD0}$ has been set equal to 1 indicating that mobile device 1 is willing to perform a fourth type of location determination related operation.

The transmitted peer discovery signal 1202 is received and recovered by mobile device 2 904. Mobile device 2 904 generates signal 1206 including a request for a timing signal used in making a round trip timing determination. Mobile device 1 902 monitors for receipt of signals from other mobile devices corresponding to its offer to perform the fourth type of location determination related determination operation. Mobile device 1 902 receives and recovers signal 1208. Mobile device 1 902 generates and transmits signal 1210 communicating information used in making a round trip timing determination. Mobile device 2 902 receives signal 1210 and recovers the information 1212. Mobile device 2 904 makes a round trip timing determination based on signal 1210 and/or information 1212. Mobile device 2 904 uses the round trip timing determination to estimate its current position.

Exemplary mobile devices (mobile device 1 902 and mobile device 2 904) of FIGS. 9-12 are, e.g., any of the mobile devices (119, 112, . . . , 114) of system 100 of FIG. 1. Mobile device 1 902, is, e.g., first mobile communications device 300 of FIG. 3 which implement a method in accordance with flowchart 200 of FIG. 2.

Figure 13:
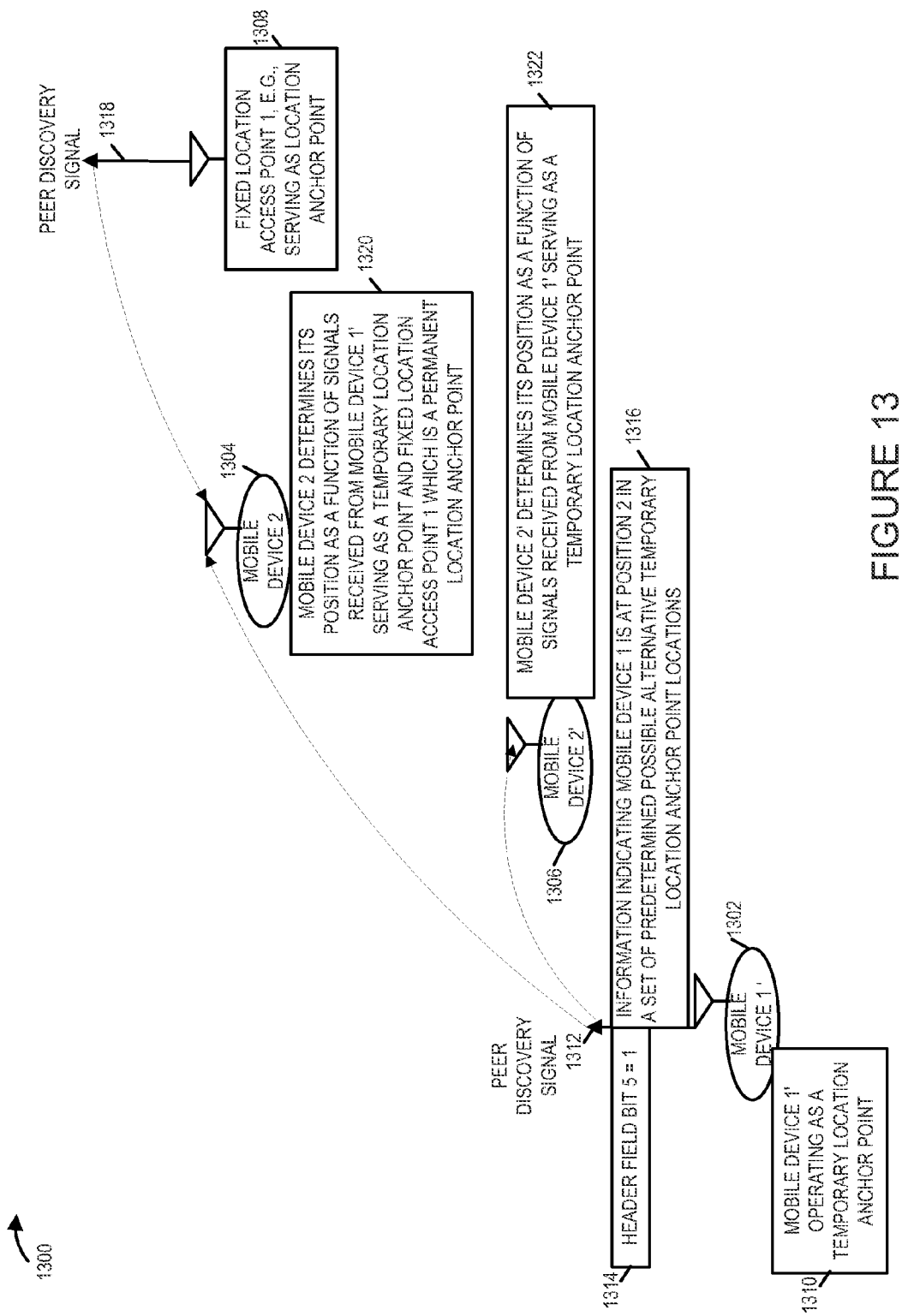
FIG. 13 is a drawing illustrating an example, in which a mobile wireless communications device transmits a signal including a first value at a predetermined location which indicates that the communications device is temporarily operating as a location anchor point in accordance with an exemplary embodiment.

FIG. 13 is a drawing 1300 illustrating an example, in which a mobile wireless communications device transmits a signal including a first value at a predetermined location which indicates that the communications device is temporarily operating as a location anchor point in accordance with an exemplary embodiment. Mobile device 1' 1302 is temporarily operating as a location anchor point as indicated by box 1310. Mobile device 1' 1310 generates and transmits peer discovery signal 1312. Peer discovery signal 1312 includes information 1314 which includes a header field in which header field bit 5 has been set equal to 1 indicating that mobile device 1' is currently operating as a location anchor point. Peer discovery signal 1312 also includes information 1316 which indicates the mobile device 1' is at position 2 in a set of predetermined possible alternative temporary location anchor point locations. Transmitted peer discovery signal 1312 is received and recovered by mobile device 2 1304 and mobile device 2' 1306.

Fixed location access point 1 1308 which serves as a permanent location anchor point, generates and transmits peer discovery signal 1318. Mobile device 2 receives and recovers peer discovery signal 1318. Mobile device 2 1304 determines its position as a function of signals received from mobile device 1', which is serving as a temporary location anchor point and signals received from fixed location access point 1 which is a permanent location anchor point, as indicated by block 1320. Mobile device 2' 1306 determines its position as a function of signals received from mobile device 1', which is serving as a temporary location anchor point.

Mobile device 1' 1302 and mobile device 2' 1306 are, e.g., any of the mobile devices with temporary location anchor point capability (520, 522, . . . , 524) of system 500 of FIG. 5. Mobile device 2 1304 is, e.g., any of the mobile devices (514, 516, . . . , 518) of system 500 of FIG. 5. In some embodiments, each of the mobile communications devices includes temporary location anchor point capability. Mobile device 1' 1302 is, e.g., communications device 700 of FIG. 7 which implements a method in accordance with flowchart 600 of FIG. 6.

Figure 14:
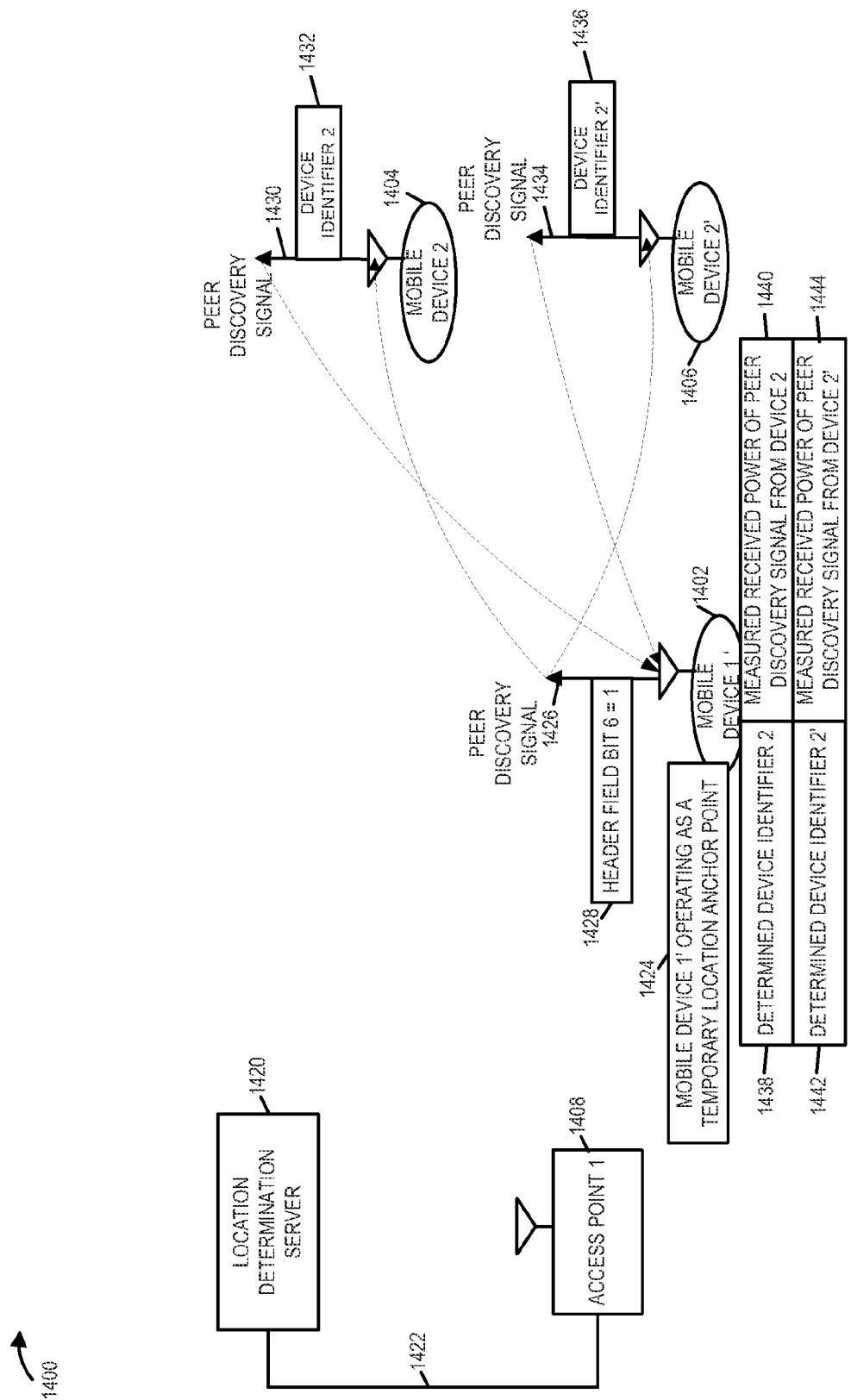
FIG. 14 illustrating the first part of an example, in which a mobile wireless communications device transmits a signal including a first value at a predetermined location which indicates that the communications device is temporarily operating as a location anchor point in accordance with an exemplary embodiment.
Figure 15:
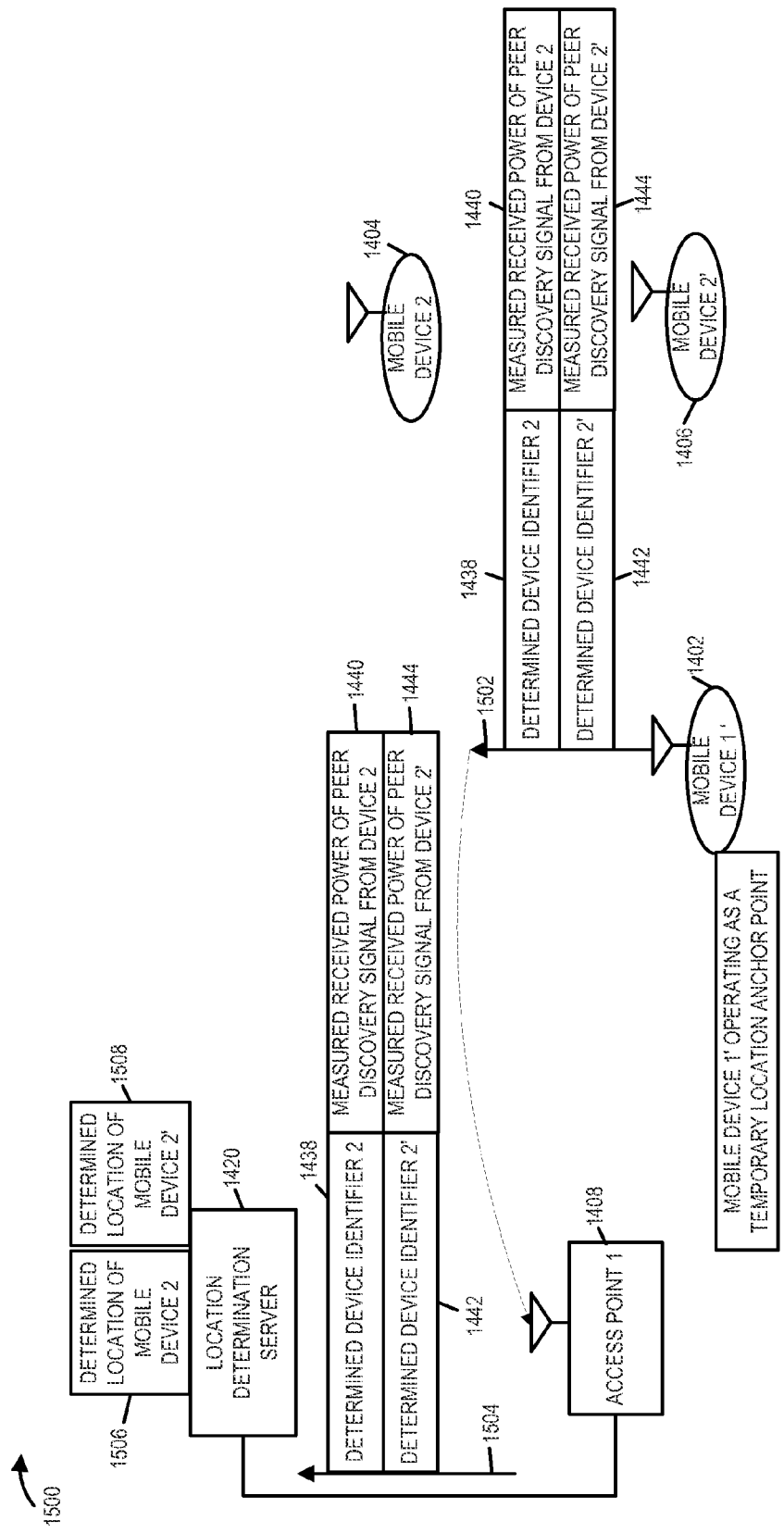
FIG. 15 illustrating the second part of an example, in which a mobile wireless communications device transmits a signal including a first value at a predetermined location which indicates that the communications device is temporarily operating as a location anchor point in accordance with an exemplary embodiment.

FIG. 14 and FIG. 15 illustrating another example, in which a mobile wireless communications device transmits a signal including a first value at a predetermined location which indicates that the communications device is temporarily operating as a location anchor point in accordance with an exemplary embodiment.

Drawing 1400 of FIG. 14 illustrates mobile device 1' 1402, mobile device 2 1404, mobile device 2' 1406, access point 1 1408 and location determination server 1420. Access point 1 1408 is coupled to location determination server 1420 via backhaul network 1422. Mobile device 1' 1402 is temporarily operating as a location anchor point as indicated by box 1424. Mobile device 1' 1402 generates and transmits peer discovery signal 1426. Peer discovery signal 1426 includes information 1428 which includes a header field in which header field bit 6 has been set equal to 1 indicating that mobile device 1' is currently operating as a location anchor point.

Transmitted peer discovery signal 1426 is received and recovered by mobile device 2 1404 and mobile device 2' 1406. Mobile device 2 1404 generates and transmits peer discovery signal 1430 including device identifier 2 1432. Mobile device 2' 1406 generates and transmits peer discovery signal 1434 including device identifier 2' 1436.

Mobile device 1' 1402 receives peer discovery signals (1430, 1434), measures the received power of the received signals obtaining information (1440, 1444). Mobile device 1' 1402 also determines the communicated identifiers obtaining information (1428, 1442).

In drawing 1500 of FIG. 15, mobile device 1' 1402, which is acting as a location anchor point, generates a signal 1502 to report the signal measurement information and information identifying the devices from which the measured signals were received to a location determination server. Wireless signal 1502 communicates information ((1438, 1440), (1442, 1444)) to access point 1 1408. Access point 1 1408 generates and transmits signal 1504, which communicates information ((1438, 1440), (1442, 1444)) over backhaul network 1422 to location determination server 1420.

Location determination server 1420 uses the received signal measurement information and corresponding identifier information to determine the location of mobile device 2 1506 and the location of mobile device 2' 1508. The received measurement information obtained from mobile device 1' 1402 may be, and sometimes is, used in combination with received measurement information communicated to the location determination server from other location anchor points which may permanent and/or temporary location anchor point.

Mobile device 1' 1402 and mobile device 2' 1406 are, e.g., any of the mobile devices with temporary location anchor point capability (520, 522, . . . , 524) of system 500 of FIG. 5. Mobile device 2 1404 is, e.g., any of the mobile devices (514, 516, . . . , 518) of system 500 of FIG. 5. In some embodiments, each of the mobile communications devices includes temporary location anchor point capability. Mobile device 1' 1402 is, e.g., communications device 700 of FIG. 7 which implements a method in accordance with flowchart 600 of FIG. 6. Access point 1 1408 is, e.g., any of the access points (502, . . . , 504, 506, . . . , 508) of system 500 of FIG. 4. Location determination serve 1420 is, e.g., location determination server 510 of system 500 of FIG. 5.

Figure 16:
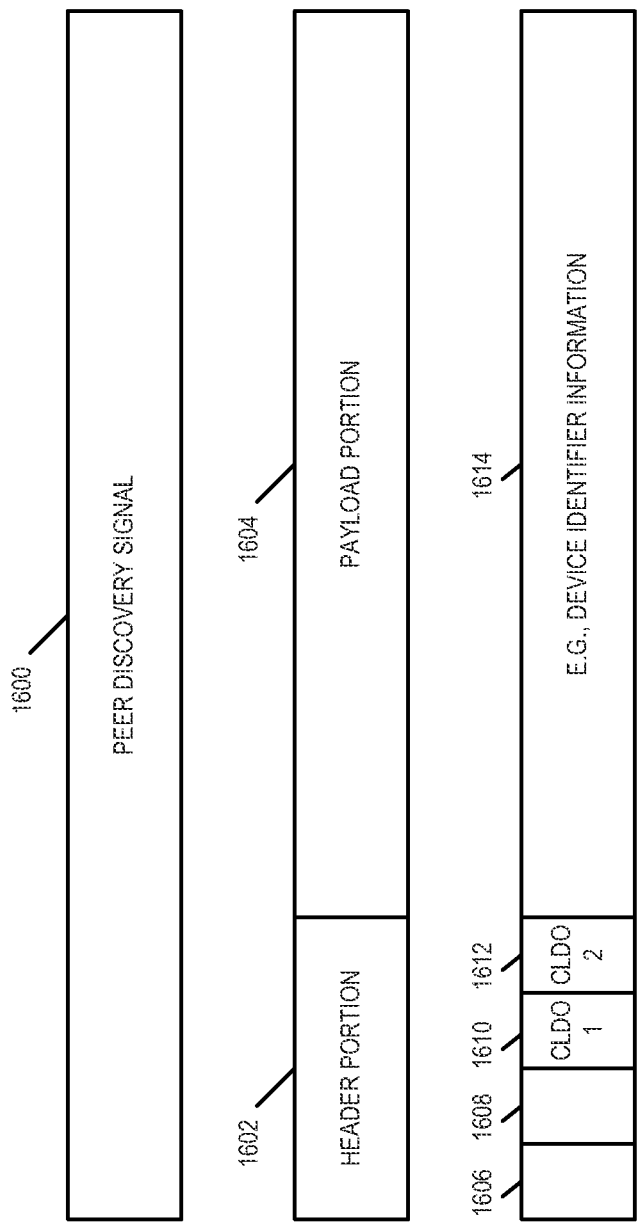
FIG. 16 illustrates an exemplary peer discovery signal, which includes predetermined header bits used to signal a willingness to perform specific cooperative location determination operations, in accordance with various embodiments.

Various aspects and features of some embodiments will be described below. FIG. 16 illustrates an exemplary peer discovery signal 1600 in accordance with various embodiments. The exemplary peer discovery signal 1600 conveys peer discovery information bits. The exemplary peer discovery signal includes a header portion 1602 and a payload portion 1604. The header portion 1602 includes a plurality of header bits (1606, 1608, 1610, 1612). The header bits include a subset of bits (1610, 1612) which are predetermined header bits used to signal a willingness to perform specific cooperative location determination operations. Bit 1610 is used to indicate the device's willingness to perform a first specific cooperative location determination operation, while bit 1612 is used to indicate the device's willingness to perform a second specific cooperative location determination operation. A cooperative location determination operation is sometimes referred to as a location determination related operation.

In some embodiments, a typical characteristic of a wireless network, e.g., a peer to peer wireless network, is that, at regular time intervals, e.g., in accordance with a predetermined peer to peer timing schedule, a subset of devices broadcast a subset of identifiers. This feature, which takes place during the peer discovery phase in some embodiments, is a core feature for many dynamic peer-to-peer networks. In some embodiments, a part of the peer discovery identifier signal is used to encode the participation of a peer to a particular positioning/estimation function. Hence, an active signal is formed that may enable a sequence of events.

More precisely, consider, e.g., an exemplary peer to peer network where the willingness of a peer to participate into a positioning function is carried by, e.g., predetermined bits of a peer discovery signal, and the peers broadcasting their peer discovery signals in a synchronized manner so the peer discovery signals are easy to receive. In some embodiments, a positioning function refers to functions associated with, for example RF fingerprint prediction map learning, joint position determination operations, and/or or any alternative hybrid position determination scheme.

For example, in some embodiments, a mobile device may, and sometimes does, signal, through the setting of a predetermined bit in a peer discovery signal that it is acting temporarily as a location anchor point, e.g., that it is temporarily broadcasting its position to other devices and/or communicating signal measurement information relating to other devices to a position determination server which uses the signal measurements and corresponding information identifying a transmitting device to determine the location of the transmitting device.

Several examples will be discussed below. A first example addresses cases where a device notifies its readiness to participate in estimating a local map parameter. Such parameters include, e.g., a specific wall material, the presence of a crowd, or a state to describe whether a door is open. For example, consider that exemplary peer mobile wireless device A happens to know its own position with some satisfying accuracy and further consider that this position is adjacent to an obstruction of undefined constituent material, e.g., a wall whose undefined constituent material makes the generation of the fingerprint prediction map unreliable. Further consider that another device, peer mobile wireless device B, shares characteristics similar to peer A. Then, either peer A or peer B may initiate paging and the two devices may exchange information regarding their respective positions. The two devices may, and sometimes do, further decide to jointly estimate the critical wall parameter. For example, they may exchange information and/or run a certain protocol, e.g., based on received power or multipath characteristics, to finely estimate the wall characteristics. In summary, a sequence of events, e.g., paging, traffic, estimation protocol, follows again from the detection of particular format bits.

A second example addresses cases where a device wants to and/or is willing to perform a position ambiguity resolution function. As in the previous example, the device's willingness can be carried by the format bits in the header of the peer discovery signal. Here, willingness may be of two types: (i) the format bits may indicate that that the emitting device's position is ambiguous and that the device wants to resolve this ambiguity or (ii) the format bits may indicate that the emitting device is ready to support a certain protocol to help other devices to resolve their location ambiguity. In the two cases, the device that detects the format bits may decide to participate in the positioning function: in this case, it will page the emitting device, and eventually may start an estimation protocol such as an RTT-based or a power-based distance estimation to solve the position ambiguity. For instance, once such a device is discovered, a sequence of events, e.g., paging, traffic, and estimation protocol, may follow. Exemplary estimation protocols include positioning protocols such as, e.g., distance estimation with pulse-based detection.

A third class of examples addresses cases when exemplary peer mobile wireless device A acts temporarily as a location anchor point in the peer to peer communications network. For example, in some embodiments, the peer to peer network includes fixed location permanent location anchor points and also includes at least some mobile wireless devices which may, and sometimes do, serve as temporary location anchor points. In some embodiments, the anchor points may be referred to as nitelites.

A first exemplary case of this third class of examples occurs if peer A is obtaining GPS or any other accurate positioning information, if peer A is at a fixed location which is well defined or known, if peer A has a sufficient level of power resources available, or if peer A is characterized by a mixture of such characteristics. If peer B comes in the vicinity of peer A, then peer B may discover and interpret the signal emitted by peer A. Consider that peer B needs to refine its position. Then, peer B will page peer A and further exchange information regarding the position of peer A and/or the associated fingerprint prediction map.

A second exemplary case of this third class of examples will now be discussed. Consider that exemplary mobile device A: (i) has obtained enough information to determine its position and (ii) has determined its position, estimated up to some satisfying reliability. For example, device A has determined its current location and has determined an estimated accuracy of the current location determination that exceeds a predetermined accuracy threshold value used by the positioning system. In this case, peer A will participate to the positioning function, and broadcast corresponding format bits. If peer B receives peer A's signal, then a sequence of events, e.g., paging, traffic, etc., similar to the previous case may occur.

In the previous examples, the detection of some specific signal encapsulated in the format/header bits of a peer discovery signal triggers a sequence of events. For example, first, a peer, e.g. in the distributed case, or a server, e.g., in the centralized case, pages the device; second, it exchanges relevant information; third and potentially, it engages a specific protocol. The specific protocol may be used to perform effective measurements. Depending on the format bits, the system behavior may change accordingly. Format bits allow for active broadcasting: the discovery by another device of a particular message carried by those format bits may enable specific processing and/or operations, and subsequent steps may again engage active broadcasting, processing and/or operations. In some embodiments, the initial broadcast of some format bits, e.g., as part of a header in a peer discovery signal, may trigger multi-level processing and/or operation, i.e., sequences of inter-dependent subroutines. The inter-dependent subroutines are, e.g., for implementing protocols, performing communications, or performing estimation. In some exemplary peer to peer protocols, format bits, e.g., peer discovery header bits, are used to trigger dependent processes in a broadcast manner. In some embodiments the format bits are also used to keep track of the state of the multi-level processing and/or operations.

In various embodiments a device, e.g., first mobile communications device 300 of FIG. 3 or communications device 700 of FIG. 7, includes a module corresponding to each of the individual steps and/or operations described with regard to any of the Figures in the present application and/or described in the detailed description of the present application. The modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., network nodes such as location determination server nodes, mobile nodes such as mobile terminals, access points such as base stations serving as location anchor points, and/or communications systems. Various embodiments are also directed to methods, e.g., method of controlling and/or operating network nodes, mobile nodes, access points such as base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as network nodes, access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer to peer signaling protocol. Various embodiments are well suited to location determination in indoor environments.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first mobile communications device to communicate device information, the method comprising:

transmitting, by the first mobile communications device, a peer discovery signal including a first predetermined bit, of a plurality of predetermined bits of a header of the peer discovery signal, designated for use in signaling a willingness to perform, by the first mobile communication device, a first device location determination related operation and a second predetermined bit, of the plurality of predetermined bits of the header of the peer discovery signal, designated for use in signaling a willingness to perform, by the first mobile communication device, a second device location determination related operation, said first predetermined bit being set to a first value when said first mobile communications device is willing to perform said first device location determination related operation and being set to a second value when said first mobile communications device is not willing to perform said first device location determination related operation;

monitoring, by the first mobile communications device, for a signal from a second mobile communications device, responsive to the peer discovery signal transmitted by the first mobile communication device and received by the second mobile communication device, corresponding to said first device location determination related operation;

during the monitoring for the signal from the second mobile communications device, receiving, by the first mobile communications device, the signal from the second mobile communications device corresponding to the first device location determination related operation;

in response to the received signal, performing, by the first mobile communications device, the first device location determination related operation; and providing, by the first mobile communications device, information related to the performance of the first device location determination related operation to the second mobile communications device, wherein said first device location determination related operation is a map parameter determination operation.

2. The method of claim 1, wherein performing the first device location determination related operation comprises:

performing a signal measurement on the received signal; and using said signal measurement to determine the presence or absence of a physical obstruction.

3. The method of claim 1, wherein said signal from the second mobile communications device is a signal transmitted by said second mobile communications device in response to receipt of said transmitted peer discovery signal.

4. The method of claim 1, wherein the map parameter indicates one or more of a wall material, the presence of a crowd, and whether a door is open or closed.

5. The method of claim 1, further comprising causing the first mobile communications device to operate as a temporary location anchor point, and transmitting the peer discovery signal with a value of one of the plurality of the predetermined bits of the header of the peer discovery signal indicating the first mobile communication device is operating as the temporary location anchor point.

6. The method of claim 5, further comprising:

determining whether the first mobile communication device is to continue to operate as the temporary location anchor point based on one or more of: a number of detected mobile communications devices, a level of peer to peer communications detected by the first mobile communications device, an amount of remaining battery power of the first mobile communications device, a number of other mobile communications devices that are operating as location anchor points, a change in a status of the first mobile communications device from motion to stationary, receipt of a request to continue operating as the temporary location anchor point, receipt of a command to continue operating as the temporary location anchor point, a change in a current location of the first mobile communication device, or time remaining in a time interval in which the first mobile communication device was to operate as the temporary anchor location point.

7. A method of operating a first mobile communications device to communicate device information, the method comprising:

transmitting, by the first mobile communications device, a peer discovery signal including a first predetermined bit, of a plurality of predetermined bits of a header of the peer discovery signal, designated for use in signaling a willingness to perform, by the first mobile communication device, a first device location determination related operation and a second predetermined bit, of the plurality of predetermined bits of the header of the peer discovery signal, designated for use in signaling a willingness to perform, by the first mobile communication device, a second device location determination related operation, said first predetermined bit being set to a first value when said first mobile communications device is willing to perform said first device location determination related operation and being set to a second value when said first mobile communications device is not willing to perform said first device location determination related operation;

monitoring, by the first mobile communications device, for a signal from a second mobile communications device corresponding to said first device location determination related operation;

during the monitoring for the signal from the second mobile communications device, receiving, by the first mobile communications device, the signal from the second mobile communications device, responsive to the peer discovery signal transmitted by the first mobile communication device and received by the second mobile communication device, corresponding to the first device location determination related operation;

in response to the received signal, performing, by the first mobile communications device, the first device location determination related operation; and providing, by the first mobile communications device, information related to the performance of the first device location determination related operation to the second mobile communications device, wherein said first device location determination related operation is a position ambiguity resolution operation.

8. The method of claim 7, further comprising causing the first mobile communications device to operate as a temporary location anchor point, and transmitting the peer discovery signal with a value of one of the plurality of the predetermined bits of the header of the peer discovery signal indicating the first mobile communication device is operating as the temporary location anchor point.

9. The method of claim 8, further comprising:
determining whether the first mobile communication device is to continue to operate as the temporary location anchor point based on one or more of: a number of detected mobile communications devices, a level of peer to peer communications detected by the first mobile communications device, an amount of remaining battery power of the first mobile communications device, a number of other mobile communications devices that are operating as location anchor points, a change in a status of the first mobile communications device from motion to stationary, receipt of a request to continue operating as the temporary location anchor point, receipt of a command to continue operating as the temporary location anchor point, a change in a current location of the first mobile communication device, or time remaining in a time interval in which the first mobile communication device was to operate as the temporary anchor location point.

10. A first mobile communications device comprising:
means for transmitting, by the first mobile communications device, a peer discovery signal including a first predetermined bit, of a plurality of predetermined bits of a header of the peer discovery signal, designated for use in signaling a willingness to perform, by the first mobile communication device, a first device location determination related operation and a second predetermined bit, of the plurality of predetermined bits of the header of the peer discovery signal, designated for use in signaling a willingness to perform, by the first mobile communication device, a second device location determination related operation, said first predetermined bit being set to a first value when said first mobile communications device is willing to perform said first device location determination related operation and being set to a second value when said first mobile communications device is not willing to perform said first device location determination related operation;
means for monitoring, by the first mobile communications device, for a signal from a second mobile communications device, responsive to the peer discovery signal transmitted by the first mobile communication device and received by the second mobile communication device, corresponding to said first device location determination related operation;
means for receiving, by the first mobile communications device during the monitoring for the signal from the second mobile communications device, the signal from the second mobile communications device corresponding to the first device location determination related operation;
means for performing, by the first mobile communications device in response to the received signal, the first device location determination related operation; and
means for providing, by the first mobile communications device, information related to the performance of the first device location determination related operation to the second mobile communications device,
wherein said first device location determination related operation is a map parameter determination operation.

11. The first mobile communications device of claim 10, wherein the means for performing the first device location determination related operation comprises:
means for performing a signal measurement on the received signal; and
means for using said signal measurement in determining said map parameter.

12. The first mobile communications device of claim 10, wherein said signal from the second mobile communications device is a signal transmitted by said second mobile communications device in response to receipt of said transmitted peer discovery signal.

13. The first mobile communications device of claim 10, wherein the map parameter indicates one or more of a wall material, the presence of a crowd, and whether a door is open or closed.

14. The first mobile communications device of claim 10, further comprising means for causing the first mobile communications device to operate as a temporary location anchor point, and means for transmitting the peer discovery signal with a value of one of the plurality of the predetermined bits of the header of the peer discovery signal indicating the first mobile communication device is operating as the temporary location anchor point.

15. The first mobile communications device of claim 14, further comprising:
means for determining whether the first mobile communication device is to continue to operate as the temporary location anchor point based on one or more of: a number of detected mobile communications devices, a level of peer to peer communications detected by the first mobile communications device, an amount of remaining battery power of the first mobile communications device, a number of other mobile communications devices that are operating as location anchor points, a change in a status of the first mobile communications device from motion to stationary, receipt of a request to continue operating as the temporary location anchor point, receipt of a command to continue operating as the temporary location anchor point, a change in a current location of the first mobile communication device, or time remaining in a time interval in which the first mobile communication device was to operate as the temporary anchor location point.

16. A computer program product for use in a first mobile communications device, the computer program product comprising:
a non-transitory computer readable medium comprising:
code for causing the first mobile communications device to transmit a peer discovery signal including a first predetermined bit, of a plurality of predetermined bits of a header of the peer discovery signal, designated for use in signaling a willingness to perform, by the first mobile communication device, a first device location determination related operation and a second predetermined bit, of the plurality of predetermined bits of the header of the peer discovery signal, designated for use in signaling a willingness to perform, by the first mobile communication device, a second device location determination related operation, said first predetermined bit being set to a first value when said first mobile communications device is willing to perform said first device location determination related operation and being set to a second value when said first mobile communications device is not willing to perform said first device location determination related operation;

code for causing the first mobile communications device to monitor for a signal from a second mobile communications device, responsive to the peer discovery signal transmitted by the first mobile communication device and received by the second mobile communication device, corresponding to said first device location determination related operation;

code for causing the first mobile communications device to receive, during the monitoring for the signal from the second mobile communications device, the signal from the second mobile communications device corresponding to the first device location determination related operation;

code for causing the first mobile communications device to perform, in response to the received signal, the first device location determination related operation; and code for causing the first mobile communications device to provide information related to the performance of the first device location determination related operation to the second mobile communications device, wherein said first device location determination related operation is a map parameter determination operation.

17. The computer program product of claim 16, wherein the map parameter indicates one or more of a wall material, the presence of a crowd, and whether a door is open or closed.

18. A first mobile communications device comprising:
at least one processor configured to:
transmit, by the first mobile communications device, a peer discovery signal including a first predetermined bit, of a plurality of predetermined bits of a header of the peer discovery signal, designated for use in signaling a willingness to perform, by the first mobile communication device, a first device location determination related operation and a second predetermined bit, of the plurality of predetermined bits of the header of the peer discovery signal, designated for use in signaling a willingness to perform, by the first mobile communication device, a second device location determination related operation, said first predetermined bit being set to a first value when said first mobile communications device is willing to perform said first device location determination related operation and being set to a second value when said first mobile communications device is not willing to perform said first device location determination related operation;

monitor, by the first mobile communications device, for a signal from a second mobile communications device, responsive to the peer discovery signal transmitted by the first mobile communication device and received by the second mobile communication device, corresponding to said first device location determination related operation;

during the monitoring for the signal from the second mobile communications device, receive, by the first mobile communications device, the signal from the second mobile communications device corresponding to the first device location determination related operation;

in response to the received signal, perform, by the first mobile communications device, the first device location determination related operation; and provide, by the first mobile communications device, information related to the performance of the first device location determination related operation to the second mobile communications device;

wherein said first device location determination related operation is a map parameter determination operation; and memory coupled to said at least one processor.

19. The computer program product of claim 16, further comprising code for causing the first mobile communications device to operate as a temporary location anchor point, and to transmit the peer discovery signal with a value of one of the plurality of the predetermined bits of the header of the peer discovery signal indicating the first mobile communication device is operating as the temporary location anchor point.

20. The computer program product of claim 19, further comprising:
code for determining whether the first mobile communication device is to continue to operate as the temporary location anchor point based on one or more of: a number of detected mobile communications devices, a level of peer to peer communications detected by the first mobile communications device, an amount of remaining battery power of the first mobile communications device, a number of other mobile communications devices that are operating as location anchor points, a change in a status of the first mobile communications device from motion to stationary, receipt of a request to continue operating as the temporary location anchor point, receipt of a command to continue operating as the temporary location anchor point, a change in a current location of the first mobile communication device, or time remaining in a time interval in which the first mobile communication device was to operate as the temporary anchor location point.

21. The first mobile communications device of claim 18, wherein the map parameter indicates one or more of a wall material, the presence of a crowd, and whether a door is open or closed.

22. The first mobile communications device of claim 18, wherein the at least one processor configured to perform the first device location determination related operation comprises said at least one processor configured to:
perform a signal measurement on the received signal; and
use said signal measurement in determining said map parameter.

23. The first mobile communications device of claim 18, wherein said signal from the second mobile communications device is a signal transmitted by said second mobile communications device in response to receipt of said transmitted peer discovery signal.

24. The first mobile communications device of claim 18, wherein the at least one processor is further configured to cause the first mobile communications device to operate as a location anchor point, and to transmit the peer discovery signal with a value of one of the plurality of the predetermined bits of the header of the peer discovery signal indicating the first mobile communication device is operating as the temporary location anchor point.

25. The first mobile communications device of claim 24, wherein the at least one processor is further configured to:
determine whether the first mobile communication device is to continue to operate as the temporary location anchor point based on one or more of: a number of detected mobile communications devices, a level of peer to peer communications detected by the first mobile communications device, an amount of remaining battery power of the first mobile communications device, a number of other mobile communications devices that are operating as location anchor points, a change in a status of the first mobile communications device from motion to stationary, receipt of a request to continue operating as the temporary location anchor point, receipt of a command to continue operating as the temporary location anchor point, a change in a current location of the first mobile communication device, or time remaining in a time interval in which the first mobile communication device was to operate as the temporary anchor location point.

\* \* \* \* \*